United States Patent
Siomina et al.

(10) Patent No.: US 10,652,725 B2
(45) Date of Patent: May 12, 2020

(54) OBTAINING AND USING D2D RELATED INFORMATION TO PERFORM MOBILITY OPERATION(S)

(71) Applicant: Telefonaktiebolaget L M Ericsson (publ), Stockholm (SE)

(72) Inventors: Iana Siomina, Solna (SE); Bengt Lindoff, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/600,449

(22) Filed: Jan. 20, 2015

(65) Prior Publication Data
US 2015/0215767 A1 Jul. 30, 2015

Related U.S. Application Data

(60) Provisional application No. 61/931,030, filed on Jan. 24, 2014.

(51) Int. Cl.
*H04W 8/02* (2009.01)
*H04W 36/00* (2009.01)
(Continued)

(52) U.S. Cl.
CPC .............. *H04W 8/02* (2013.01); *H04W 4/027* (2013.01); *H04W 36/03* (2018.08); *H04W 48/20* (2013.01); *H04W 76/14* (2018.02); *H04W 36/08* (2013.01)

(58) Field of Classification Search
CPC ....... H04W 4/008; H04W 4/027; H04W 8/02; H04W 24/02; H04W 36/08;
(Continued)

(56) References Cited

U.S. PATENT DOCUMENTS

2012/0131153 A1* 5/2012 Schmidt ................ H04L 61/103
709/220
2012/0290650 A1* 11/2012 Montuno .............. H04W 4/008
709/204
(Continued)

FOREIGN PATENT DOCUMENTS

EP 2665297 A1 11/2013
EP 2763495 A1 8/2014
(Continued)

OTHER PUBLICATIONS

International Search Report and Written Opinion for International Patent Application No. PCT/IB2015/050500, dated May 19, 2015, 18 pages.
(Continued)

*Primary Examiner* — George Eng
*Assistant Examiner* — Hung K Du
(74) *Attorney, Agent, or Firm* — Withrow & Terranova, PLLC

(57) ABSTRACT

The present disclosure relates to systems and methods for obtaining and using Device-to-Device (D2D) related information for a node (e.g., a wireless device or a network node) in a cellular communications network to perform one or more mobility operations for a wireless device. Embodiments of a method of operation of a network node for operation in the cellular communications system are disclosed. In some embodiments, the method of operation of the network node in the cellular communications system comprises obtaining D2D related information for one or more nodes in the cellular communications system, and using the D2D related information to perform one or more mobility operations associated with the wireless device.

22 Claims, 19 Drawing Sheets

(51) Int. Cl.
*H04W 48/20* (2009.01)
*H04W 76/14* (2018.01)
*H04W 4/02* (2018.01)
*H04W 36/08* (2009.01)

(58) Field of Classification Search
CPC . H04W 72/1278; H04W 8/005; H04W 48/20; H04W 76/02; H04W 76/023; H04W 48/00; H04W 36/00; H04W 36/0011; H04W 36/16; H04W 36/36; H04W 8/20; H04W 36/03; H04W 76/14
See application file for complete search history.

(56) References Cited

U.S. PATENT DOCUMENTS

| | | | |
|---|---|---|---|
| 2013/0109301 A1 | 5/2013 | Hakola et al. | |
| 2013/0150051 A1* | 6/2013 | Van Phan | H04W 12/04 455/437 |
| 2013/0301438 A1 | 11/2013 | Li et al. | |
| 2013/0324114 A1* | 12/2013 | Raghothaman | H04W 8/005 455/426.1 |
| 2014/0153390 A1* | 6/2014 | Ishii | H04W 76/023 370/230 |
| 2014/0206348 A1* | 7/2014 | Johnsson | H04W 8/005 455/434 |
| 2014/0235248 A1 | 8/2014 | Chai et al. | |
| 2014/0274066 A1* | 9/2014 | Fodor | H04W 36/08 455/437 |
| 2015/0011247 A1* | 1/2015 | Ezra | G06F 3/017 455/456.3 |
| 2015/0043429 A1 | 2/2015 | Kim et al. | |
| 2015/0043448 A1 | 2/2015 | Chatterjee et al. | |
| 2015/0189685 A1 | 7/2015 | Yao | |
| 2015/0208452 A1* | 7/2015 | Lee | H04W 76/14 455/426.1 |
| 2015/0215982 A1 | 7/2015 | Siomina et al. | |
| 2015/0223279 A1 | 8/2015 | Jiao et al. | |
| 2015/0327047 A1 | 11/2015 | Tiirola et al. | |
| 2015/0341773 A1* | 11/2015 | Ribeiro | H04W 4/008 370/329 |
| 2015/0365942 A1* | 12/2015 | Niu | H04W 74/02 370/330 |
| 2016/0066209 A1 | 3/2016 | Lin | |
| 2016/0323868 A1 | 11/2016 | Kalhan et al. | |

FOREIGN PATENT DOCUMENTS

| | | | |
|---|---|---|---|
| WO | 2011051745 A1 | 5/2011 | |
| WO | 2012152224 A1 | 11/2012 | |
| WO | 2013044864 A1 | 4/2013 | |
| WO | 2013055271 A1 | 4/2013 | |

OTHER PUBLICATIONS

International Search Report and Written Opinion for International Patent Application No. PCT/IB2015/050503, dated Jun. 24, 2015, 10 pages.
Author Unknown, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)," Technical Speification 36.300, Version 11.6.0, 3GPP Organizational Partners, Jun. 2013, 209 pages.
Author Unknown, "Technical Specification Group Services and Systems Aspects; Feasibility study for Proximity Services (ProSe) (Release 12)," Technical Report 22.803, Version 12.2.0, 3GPP Organizational Partners, Jun. 2013.
Final Office Action for U.S. Appl. No. 14/600,522, dated Aug. 9, 2016, 35 pages.
Advisory Action, Applicant-Initiated Interview Summary, and AFCP 2.0 Decision for U.S. Appl. No. 14/600,522, dated Nov. 4, 2016, 7 pages.
Non-Final Office Action for U.S. Appl. No. 14/600,522, dated Mar. 24, 2017, 32 pages.
Non-Final Office Action for U.S. Appl. No. 14/600,522, dated Mar. 7, 2016, 30 pages.
Final Office Action for U.S. Appl. No. 14/600,522, dated Sep. 7, 2017, 33 pages.
Advisory Action for U.S. Appl. No. 14/600,522, dated Dec. 1, 2017, 4 pages.
Notice of Allowance for U.S. Appl. No. 14/600,522, dated Mar. 27, 2018, 11 pages.
Examination Report for Indian Patent Application No. 201617018096, dated Dec. 23, 2019, 10 pages.

* cited by examiner

OBTAINING AND USING D2D RELATED INFORMATION TO PERFORM MOBILITY OPERATION(S)

RELATED APPLICATIONS

This application claims the benefit of provisional patent application Ser. No. 61/931,030, filed Jan. 24, 2014, the disclosure of which is hereby incorporated herein by reference in its entirety.

FIELD OF THE DISCLOSURE

The present disclosure relates to Device-to-Device (D2D) communication in a cellular communications system.

BACKGROUND

Device-to-Device (D2D) communication in a cellular communications system is receiving a significant amount of interest, particularly with respect to next and future generation networks. D2D communication is communication between a source device and a target device, where both the source device and the target device are wireless devices (e.g., User Equipment devices (UEs) in Third Generation Partnership Project (3GPP) terminology). Some of the potential advantages of D2D communication include offloading by the cellular network, faster communications, increased awareness of surrounding wireless devices of interest (e.g., running the same or a related application), more reliable and higher quality links due to shorter distances between devices, and the like. Some applications of D2D communication include video streaming, online gaming, media downloading, Peer-to-Peer (P2P), file sharing, and the like.

D2D communications may coexist with cellular communications. Unlike conventional cellular communications, D2D-capable wireless devices that are in proximity to each other can use a "direct mode" or a "locally routed" path for data communication. Thus, a D2D communication can establish a direct local link between wireless devices to bypass conventional cellular communications.

Cellular communications networks based on the 3GPP Long Term Evolution (LTE) standard may include a combination of densely deployed nodes that control respective cells in a heterogeneous network. These networks provide load balancing in response to demands for bandwidth and improved user experience. Mobility operations are performed by network nodes or wireless devices to maintain a uniform user experience in LTE cellular communications. Mobility operations include cell selection, reselection, changing cells, or the like. Mobility operations also include prioritization or ranking of cells, Radio Access Technologies (RATs), Public Land Mobile Networks (PLMNs), or the like.

Cell selection and reselection is typically based on measurements performed at a wireless device. For example, a wireless device may measure a received signal, in Decibels (dB), from a cell. The cell may be selected if it satisfies criteria such as a dB value measured at or above a threshold, or the quality signal value (in dB) is above a threshold. Cell reselection may occur when a wireless device is being served by a cell and a neighboring cell is a threshold value better for a certain period of time compared to the serving cell. Performing cell reselection can also be speed-dependent and consider the speed of only one wireless device for cell selection.

Cell selection can be performed for a wireless device in a particular state or when transitioning to a different state. For example, cell selection may be required upon transition by a wireless device from an idle state to an active (e.g., connected) state. Examples include cell transition from EMM-DETACHED to EMM-REGISTERED, and from ECM-IDLE to ECM-CONNECTED. To select a cell, a wireless device may first identify a cell from each carrier frequency that has the strongest signal. These cells are generally desirable because they provide an improved quality of radio communications due to an improved radio link. The wireless device then identifies a suitable cell as the strongest cell from among those with the strongest signal for each carrier frequency. A wireless device may identify an acceptable cell if the wireless device failed to identify a suitable cell. After a suitable or acceptable cell has been identified, the wireless device camps on that cell and commences performing cell selection or reselection. To be camped on a cell refers to a wireless device (e.g., UE) that has completed the cell selection/reselection process and has chosen a cell. The wireless device monitors system information and (in most cases) paging information.

A suitable cell may have measured attributes that satisfy selection criteria. In addition, the cell may have a designated, registered, or equivalent PLMN, the cell is not barred or reserved, and the cell is not in a forbidden tracking area for roaming. On the other hand, an acceptable cell has measured attributes that merely satisfy selection criteria, and the cell must also not be barred from being selected.

Cell reselection can be performed by a wireless device in an idle state. Cell reselection may be based on reselection criteria that are used to identify a cell that the wireless device should camp on. Similar to selection, reselection involves performing measurements on serving and neighboring cells. A wireless device can generally search and measure cells without having neighbor cell lists. Examples of reselection criteria include intra-frequency reselection based on ranking of cells, and inter-frequency reselection based on absolute priorities. Under inter-frequency reselection, a wireless device tries to camp on the highest priority frequency available. Absolute priorities for reselection are provided only by the Registered PLMN (RPLMN) and are valid only within the RPLMN.

Cell reselection can be performed by a wireless device in a connected state. For example, reselection in LTE RRC_CONNECTED state is a part of a handover procedure. These handovers are network-controlled and wireless device-assisted. That is, the handover decision is made by the network based on wireless device measurement reports and Radio Resource Management (RRM) information such as cell load level.

SUMMARY

Systems and methods relating to obtaining Device-to-Device (D2D) related information and performing one or more mobility operations based on the D2D related information are disclosed. Embodiments of a method of operation of a network node for operation in a cellular communications system are disclosed. In some embodiments, the method of operation of the network node in the cellular communications system comprises obtaining D2D related information for one or more nodes in the cellular communications system, and using the D2D related information to perform one or more mobility operations associated with a wireless device.

In some embodiments, the network node is a first radio network node, the wireless device is a first wireless device, and the one or more nodes comprise at least one of a group consisting of the first wireless device, a second wireless device that is capable of performing D2D operations associated with the first wireless device, the first radio network node that is serving the first wireless device, and a second radio network node of a target cell for connection by the first wireless device.

In some embodiments, the one or more mobility operations comprise at least one of a group consisting of a handover operation, a selection operation, and a reselection operation.

In some embodiments, using the D2D related information to perform the one or more mobility operations further comprises at least one of a group consisting of prioritizing or ranking two or more cells, Radio Access Technologies (RATs), frequency carriers, or Public Land Mobile Networks (PLMNs) for the wireless device.

In some embodiments, using the D2D related information to perform the one or more mobility operations further comprises at least one of a group consisting of changing one or more cells, RATs, frequency carriers, or PLMNs for the wireless device.

In some embodiments, the D2D related information comprises at least one of a group consisting of information indicative of a location of the wireless device, information indicative of a direction of movement of the wireless device, information indicative of a speed of movement of the wireless device, and information indicative of an acceleration of movement of the wireless device.

In some embodiments, the wireless device is a first wireless device, and at least one of the location, direction, speed, and acceleration of the first wireless device is relative to at least one of a radio network node and a second wireless device.

In some embodiments, the D2D related information comprises at least one of a group consisting of information indicative of a capability associated with one or more D2D activities on a predetermined carrier frequency, information indicative of a capability associated with one or more D2D activities in a predetermined frequency band, information indicative of a capability associated with one or more D2D activities associated with one or more predetermined RATs, and information indicative of a capability associated with one or more D2D activities in a predetermined bandwidth.

In some embodiments, the D2D related information comprises at least one of a group consisting of information indicative of a capability associated with one or more D2D activities of a predetermined type, information indicative of a capability associated with one or more D2D activities for a predetermined purpose, information indicative of a capability associated with one or more D2D activities for a predetermined application, and information indicative of a capability associated with one or more D2D activities of a predetermined service.

In some embodiments, the wireless device is a first wireless device, and the D2D related information comprises at least one of a group consisting of information indicative of a quality, characteristic, purpose, or type of a D2D activity associated with at least one of the first wireless device and a second wireless device, information indicative of a quality, characteristic, purpose, or type of a D2D service associated with at least one of the first wireless device and the second wireless device, and information indicative of a quality, characteristic, purpose, or type of a D2D application associated with at least one of the first wireless device and the second wireless device.

In some embodiments, the at least one of the D2D activity, the D2D service, and the D2D application is ongoing, and comprises at least one of a group consisting of D2D discovery, D2D broadcast, group, or unicast communications, D2D communications for public safety, D2D application identity, and type of one or more radio signals or channels transmitted or received by the first wireless device.

In some embodiments, the D2D related information comprises at least one of a group consisting of information indicative of a capability to support or participate in D2D operations, information indicative of a capability to transmit or receive at least one of radio signals or channels associated with D2D operations, information indicative of a capability to operate as a D2D controlling node for one or more wireless devices, and information indicative of a capability to support a predetermined type of scheduling for D2D activities.

In some embodiments, the D2D related information comprises at least one of a group consisting of information indicative of an availability or a utilization of a bandwidth, and information indicative of an availability or a utilization of one or more radio resources required to perform D2D related operations.

In some embodiments, the wireless device is a first wireless device, and the D2D related information comprises at least one of a group consisting of information indicative of a number of D2D links associated with the one or more nodes, information indicative of a number of D2D connections associated with the one or more nodes, and information indicative of a number of D2D sessions associated with the one or more nodes.

In some embodiments, obtaining the D2D related information comprises obtaining the D2D related information for at least one of the one or more nodes from a node other than the at least one of the one or more nodes.

In some embodiments, obtaining the D2D related information comprises obtaining the D2D related information from a signaling node, via at least one of a group consisting of signaling at a protocol layer higher than a physical layer, and signaling at the physical layer.

In some embodiments, the wireless device is a first wireless device, and the signaling node is one of a group consisting of the first wireless device, a second wireless device that is capable of D2D communications with the first wireless device, and a network node.

In some embodiments, obtaining the D2D related information comprises retrieving the D2D related information from at least one of an internal storage of the network node and an external storage accessible by the network node.

In some embodiments, the D2D related information retrieved from the at least one of the internal storage and the external storage comprises at least one of a group consisting of information provided by a subscription service, information comprising historical data, and information comprising configuration data for the one or more nodes.

In some embodiments, obtaining the D2D related information comprises determining the D2D related information based on one or more predefined rules.

In some embodiments, one of the one or more predefined rules associates an identifier associated with the wireless device to predefined D2D operations.

In some embodiments, the wireless device is a first wireless device, the network node is a radio network node controlling a serving cell of the first wireless device and a second wireless device, the D2D related information comprises D2D related information for the serving cell and one or more neighboring cells, the first wireless device and the second wireless device are capable of one or more D2D operations, and using the D2D related information to perform the one or more mobility operations comprises determining that the radio network node controlling the serving cell does not support the one or more D2D operations, selecting a neighboring cell from the one or more neighboring cells that supports the one or more D2D operations, thereby defining a selected neighboring cell, and sending respective handover commands to the first wireless device and the second wireless device to perform respective handover operations to the selected neighboring cell.

In some embodiments, the wireless device is a first wireless device, the network node is a radio network node controlling a serving cell of the first wireless device and a second wireless device, the D2D related information comprises D2D related information for the serving cell and one or more neighboring cells, the first wireless device and the second wireless device are capable of one or more D2D operations, and using the D2D related information to perform the one or more mobility operations comprises determining that the radio network node controlling the serving cell does not support the one or more D2D operations, identifying one or more neighboring cells that support the one or more D2D operations, from the one or more neighboring cells communicating information of the one or more neighboring cells to at least one of the first wireless device and the second wireless device, receiving measurements information for the one or more neighboring cells that support the one or more D2D operations from at least one of the first wireless device and the second wireless device, selecting one of the one or more neighboring cells that support the one or more D2D operations, based on the received measurements information, thereby defining a selected neighboring cell, and communicating respective handover commands to the first wireless device and the second wireless device to perform respective handover operations to the selected neighboring cell.

In some embodiments, the network node is a radio network node controlling a serving cell of the wireless device, the D2D related information comprises D2D related information for the serving cell and one or more neighboring cells, and using the D2D related information to perform the one or more mobility operations comprises receiving a request for one or more D2D related services from the wireless device, determining that the serving cell does not support the one or more D2D related services, identifying one or more neighboring cells that support the one or more D2D related services, from the one or more neighboring cells, selecting one of the one or more neighboring cells for a handover operation, thereby defining a selected neighboring cell, and communicating a handover command to the wireless device to perform the handover to the selected neighboring cell.

In some embodiments, the network node is a radio network node controlling a serving cell of the wireless device, the D2D related information comprises D2D related information for the serving cell and one or more neighboring cells, and using the D2D related information to perform the one or more mobility operations comprises receiving a request for one or more D2D related services from the wireless device, determining that the serving cell does not support the one or more D2D related services, identifying one or more neighboring cells that support the one or more D2D related services, from the one or more neighboring cells, communicating information of the one or more neighboring cells that support the one or more D2D related services to the wireless device, receiving measurements information for the one or more neighboring cells that support the one or more D2D related services from the wireless device, selecting one of the one or more neighboring cells for a handover operation based on the measurements information, thereby defining a selected neighboring cell, and performing a handover operation for the wireless device to the selected neighboring cell.

Embodiments of a network node for operation in a cellular communications system are also disclosed. In some embodiments, the network node in the cellular communications system comprises at least one communication interface, at least one processor, and memory containing instructions executable by the at least one processor, whereby the network node is operative to obtain D2D related information for one or more nodes in the cellular communications system, and use the D2D related information to perform one or more mobility operations associated with a wireless device.

Embodiments of a method of operation of a wireless device for operation in a cellular communications system are also disclosed. In some embodiments, the method of operation of the wireless device for operation in the cellular communications system comprises obtaining D2D related information for one or more nodes in the cellular communications system, and using the D2D related information to perform one or more mobility operations associated with the wireless device.

In some embodiments, the wireless device is camped on a cell, the D2D related information comprises D2D related information for the camped on cell and one or more neighboring cells, and using the D2D related information to perform the one or more mobility operations comprises determining a need to perform one or more D2D related services, and performing a reselection operation to a neighboring cell from the one or more neighboring cells that supports the one or more D2D related services when the camped on cell does not support the one or more D2D related services.

In some embodiments, the wireless device needs to perform one or more D2D related services and is camped on a cell, the D2D related information comprises D2D related information for the camped on cell and one or more neighboring cells, and using the D2D related information to perform the one or more mobility operations comprises determining that the camped on cell does not support the one or more D2D related services, identifying one or more neighboring cells that support the one or more D2D related services, from the one or more neighboring cells, selecting one of the one or more neighboring cells that supports the one or more D2D related services, thereby defining a selected neighboring cell, and performing a reselection operation to the selected neighboring cell.

In some embodiments, the wireless device needs to perform one or more D2D related services and is camped on a cell, the D2D related information comprises D2D related information for the camped on cell and one or more neighboring cells, and using the D2D related information to perform the one or more mobility operations comprises communicating a request for the one or more D2D related services to the camped on cell, receiving information identifying one or more neighboring cells that support the one or more D2D related services when the camped on cell does not support the one or more D2D related services, selecting one of the one or more neighboring cells that supports the one or more D2D related services, thereby defining a selected neighboring cell, and performing a reselection operation to the selected neighboring cell.

In some embodiments, obtaining the D2D related information comprises obtaining the D2D related information via a broadcast signal or a multicast signal from at least one of the one or more nodes.

In some embodiments, obtaining the D2D related information comprises determining the D2D related information for the one or more nodes based on one or more measurements performed on one or more known signals transmitted by the one or more nodes.

Embodiments of a wireless device for operation in a cellular communications system are also disclosed. In some embodiments the wireless device for operation in the cellular communications system comprises a transceiver comprising at least one transmitter and at least one receiver, at least one processor, and memory containing instructions executable by the at least one processor, whereby the wireless device is operative to obtain D2D related information for one or more nodes in the cellular communications system, and use the D2D related information to perform one or more mobility operations associated with the wireless device.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
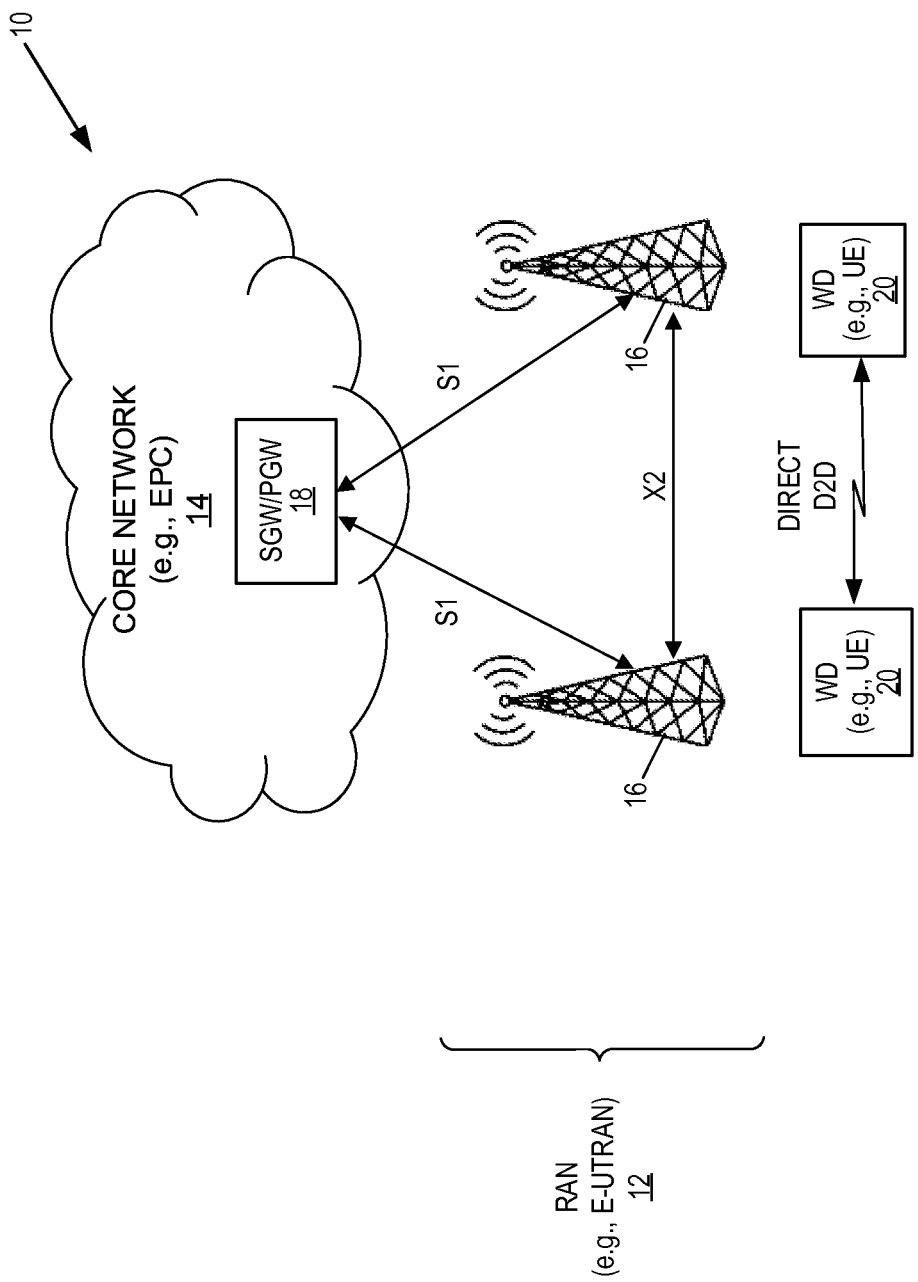
FIG. 1 illustrates direct Device-to-Device (D2D) communication between two wireless devices via a direct D2D link in a cellular communications system.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of systems and methods for providing, obtaining, and using Device-to-Device (D2D) related information of one or more nodes (e.g., network nodes and/or wireless devices) in a cellular communications network to perform one or more mobility operations for a wireless device. Before proceeding, a description of some terminology that is used throughout this disclosure is beneficial.

D2D: As used herein, the terms D2D and Proximity Service (ProSe) may be used interchangeably.

D2D Device: As used herein, a D2D device, or interchangeably called a wireless device or User Equipment (UE) in some embodiments herein, is any device capable of at least receiving or transmitting radio signals on a direct or locally routed radio link between the D2D device and another D2D device. A D2D device (or D2D-capable device) may also be comprised in a cellular UE, a Personal Digital Assistant (PDA), a laptop, a mobile phone, a sensor, a relay, a D2D relay, or even a small base station (e.g., a low power or small cell base station) employing a UE-like interface.

D2D Transmission: As used herein, a D2D transmission is any transmission by a D2D device. Some examples of D2D transmissions are physical signals or physical channels, dedicated or common/shared signals, e.g., a reference signal, a synchronization signal, a control channel, a data channel, a broadcast channel, a paging channel, etc. A D2D transmission on a direct or locally routed radio link is intended for receiving by another D2D device. A D2D transmission may be a unicast, groupcast, or broadcast transmission.

D2D Communication: As used herein, D2D communication is communication over a D2D link between at least a source D2D device and a target D2D device. The D2D communication may be over a direct D2D link between the source and destination D2D devices or over a locally routed D2D link between the source and destination D2D devices.

Direct D2D Link: As used herein, a direct D2D link is a link between a source D2D device and a target D2D device that does not pass through any intermediate nodes (i.e., the link is directly from the source D2D device to the target D2D device) (see FIG. 1 as an example).

Locally Routed D2D Link: As used herein, a locally routed D2D link is a link between a source D2D device and a target D2D device that passes through a common radio access node without passing through the core network (see FIG. 2 as an example).

Coordinating Node: As used herein, a coordinating node is a node that schedules, decides, at least in part, or selects time-frequency resources to be used for at least one of: cellular transmissions and D2D transmissions. The coordinating node may also provide the scheduling information to another node such as another D2D device, a cluster head, a radio network node such as an Evolved or Enhanced Node B (eNB), or a network node (e.g., a core network node).

Radio Spectrum: Although at least some of the embodiments are described for D2D transmissions in the uplink spectrum (e.g., Frequency Division Duplexing (FDD)) or uplink resources (e.g., Time Division Duplexing (TDD)), the embodiments disclosed herein are not limited to the usage of uplink radio resources, neither to licensed nor unlicensed spectrum, or any specific spectrum at all.

Cellular Network: A cellular network, which is interchangeably referred to herein as a cellular communications system, may comprise, e.g., a Long Term Evolution (LTE) network (e.g., FDD or TDD), a Universal Terrestrial Radio Access (UTRA) network, a Code Division Multiple Access (CDMA) network, WiMAX, a Global System for Mobile Communications (GSM) network, or any network employing any one or more Radio Access Technologies (RATs) for cellular operation. The description of many of the embodiments provided herein focuses on LTE and, as such, LTE terminology is oftentimes used; however, the embodiments described herein are not limited to the LTE RAT.

RAT: Example RATs include, e.g., LTE, GSM, CDMA, Wideband CDMA (WCDMA), WiFi, Wireless Local Area Network (WLAN), WiMAX, etc.

Figure 2:
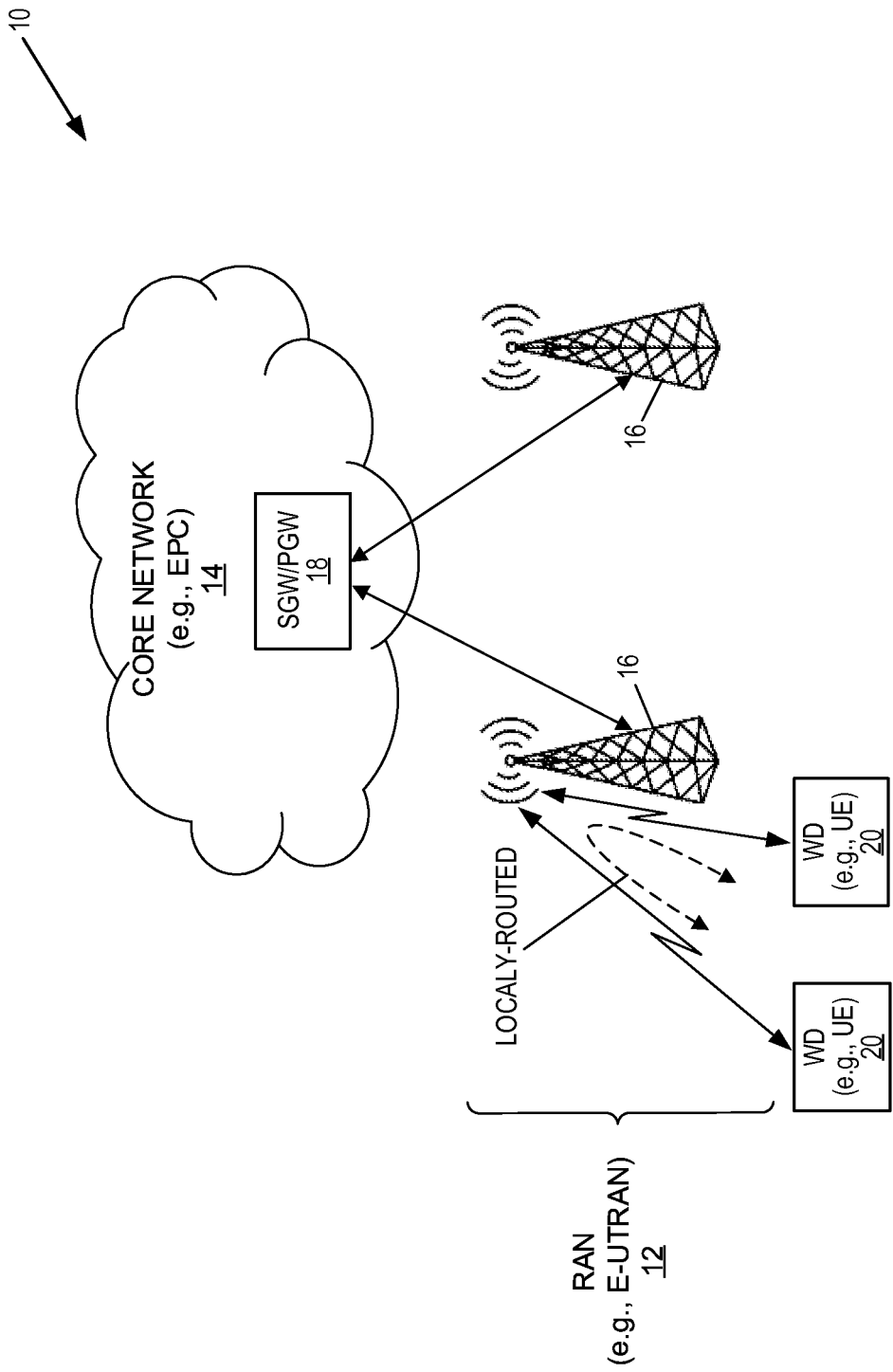
FIG. 2 illustrates locally routed D2D communication between two wireless devices in a cellular communications system.
Figure 3:
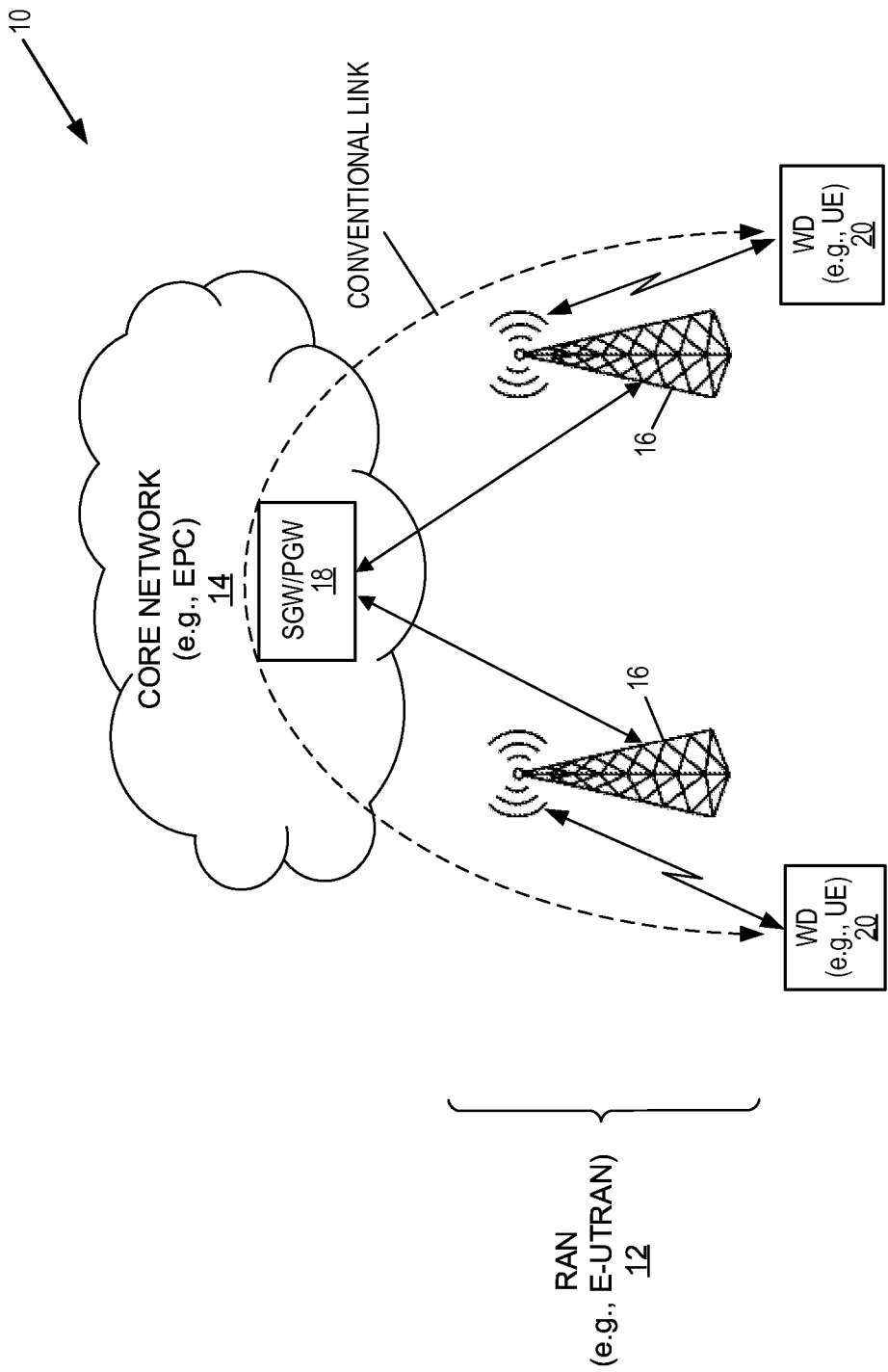
FIG. 3 illustrates conventional cellular communication between two wireless devices in a cellular communications system.

FIGS. 1 and 2 illustrate examples of D2D communications in a cellular communications system 10. In contrast, FIG. 3 illustrates a conventional communication between two wireless devices in a cellular communications system 10. Specifically, as illustrated in FIGS. 1 through 3, the cellular communications system 10 includes a Radio Access Network (RAN) 12 (e.g., an Evolved or Enhanced Universal Terrestrial Radio Access Network (E-UTRAN)) and a core network 14 (e.g., an Evolved or Enhanced Packet Core (EPC)). The RAN 12 includes a number of base stations 16, which in Third Generation Partnership Project (3GPP) LTE are eNBs. Notably, base stations 16 are only examples of nodes in the RAN 12, which are referred to herein as radio network nodes or radio access nodes. Other examples of radio network nodes include Remote Radio Heads (RRHs), etc. The core network 14 includes a number of core network nodes such as a Serving Gateway (SGW) or Packet (or Packet Data Network) Gateway (PGW) 18. The base stations 16 may be each connected to the SGW/PGW 18 via S1 interfaces. The base stations 16 may be connected to each other via X2 interfaces.

FIG. 1 illustrates direct D2D communication between two wireless devices 20 via a direct D2D link. In contrast, FIG. 2 illustrates locally routed D2D communication between two wireless devices 20 via a locally routed D2D link. As shown, the locally routed D2D communication is routed through the base station 16 without passing through the core network 14. In other words, a D2D transmission from one of the wireless devices 20 is transmitted from that wireless device 20 to the base station 16 and then transmitted from the base station 16 to the other wireless device 20 without passing through the core network 14.

In contrast to the D2D communications shown in FIGS. 1 and 2, FIG. 3 illustrates conventional cellular communication between two wireless devices 20. For example, a transmission from a source wireless device 20 is transmitted therefrom to the base station 16, which is serving the source wireless device 20. The transmission is then transmitted through the core network 14 to another base station 16 that serves the target/destination wireless device 20. The transmission is then transmitted therefrom to the target/destination wireless device 20.

Figure 4:
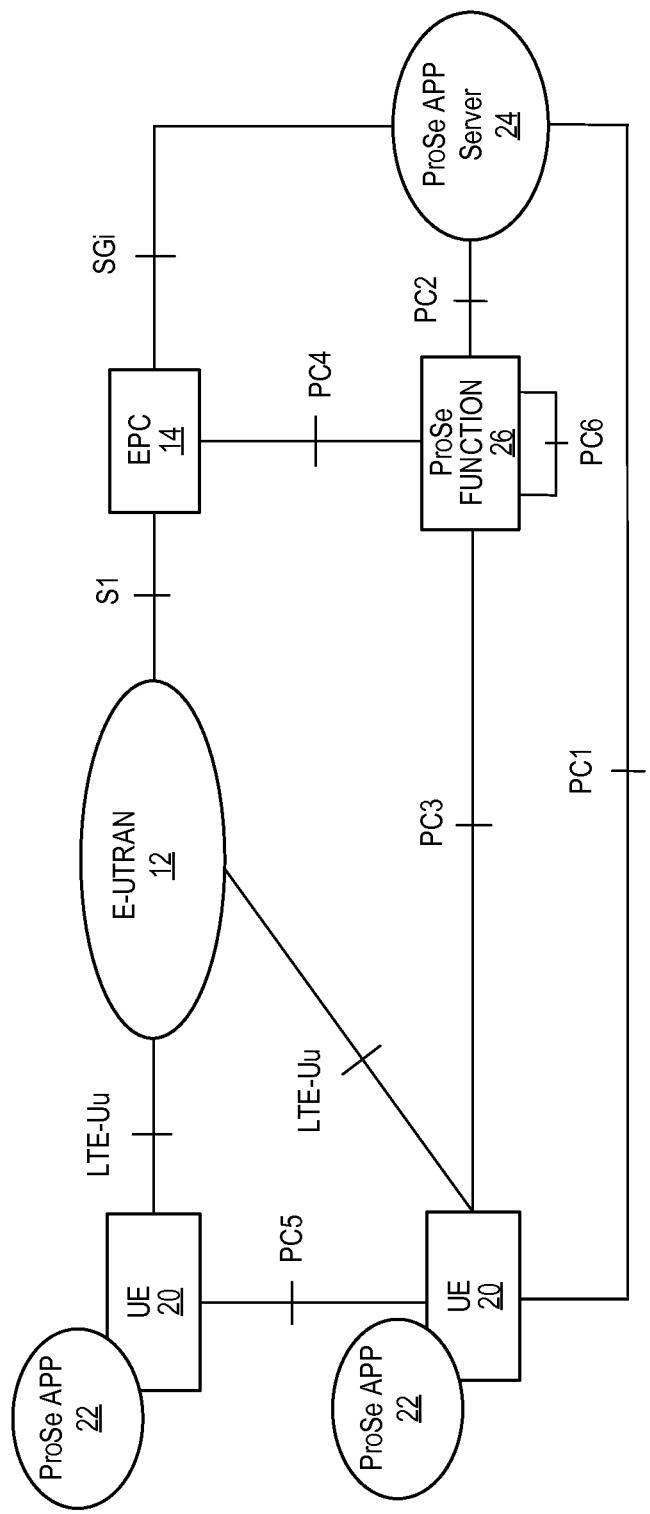
FIG. 4 illustrates an example of a D2D architecture for a cellular communications system.

An example of a D2D architecture including the interfaces between various nodes is illustrated in FIG. 4. In this example, the architecture is a 3GPP LTE architecture and, as such, LTE terminology is used. As illustrated, wireless devices (e.g., UEs) 20 are connected to the RAN (i.e., an E-UTRAN) 12 via corresponding LTE-Uu interfaces. The E-UTRAN 12 is connected to the core network (i.e., an EPC) 14 via an S1 interface. The UEs 20 include ProSe Applications (APPs) 22 that enable D2D communications between the UEs 20 via a direct D2D link. This direct D2D link is provided via an interface referred to in FIG. 4 as a PC5 interface. The direct link may use uplink time and/or frequency resources of the E-UTRAN 12, downlink time and/or frequency resources of the E-UTRAN 12, or time and/or frequency resources that are not utilized by the E-UTRAN 12 (e.g., an unlicensed spectrum).

In this example, one of the UEs 20 is also connected to a ProSe APP server 24 and a ProSe function 26 via interfaces referred to in FIG. 4 as PC1 and PC3 interfaces, respectively. The ProSe APP server 24 and the ProSe function 26 may provide server-side functionality related to the D2D communication between the UEs 20. In some embodiments, the communication for the PC1 and PC3 interfaces is transported over the E-UTRAN 12 and the EPC 14 but is transparent to the E-UTRAN 12 and the EPC 14. The EPC 14 is connected to the ProSe APP server 24 via an SGi interface and connected to the ProSe function 26 via a PC4 interface. The ProSe APP server 24 and the ProSe function 26 are connected via a PC2 interface. Lastly, the ProSe function 26 may use a PC6 interface for communication between internal components of the ProSe function 26.

Systems and methods are disclosed herein for enabling, or at least improving, D2D operations and services in a cellular communications system, such as the cellular communications system 10 of FIGS. 1 and 2. Notably, the disclosed embodiments may be combined with each other in any way.

Before describing embodiments of the present disclosure, a discussion of some problems with existing D2D solutions is beneficial.

In conventional systems, when within network coverage, a wireless device performs selection, reselection, changing, or prioritization/ranking of cells, carrier frequencies, RATs, or Public Land Mobile Network (PLMN) without taking into account D2D related information. Thus, D2D related information about nodes is not obtained or utilized by wireless devices that are involved in, or may be interested in, D2D operations, which may lead to wasting network radio resources and also to D2D performance degradation. Also, mobility-related decisions (e.g., handover) at the network side do not account for D2D related information. Furthermore, the speed-dependent cell selection used in conventional systems is currently not accounting for D2D related information since it accounts for the speed of only one device, while at least two devices are involved in D2D communication.

Users of wireless devices would benefit from network nodes that are aware of neighboring or adjacent network nodes that support certain D2D operations to, for example, perform a mobility operation to a network node that is capable of engaging in a desired D2D activity. However, obtaining such information is not possible in current systems. For example, if a wireless device 20 is interested in a D2D operation, the wireless device 20 may need to be aware of which radio network nodes (e.g., base stations 16) that support D2D operations generally, and support the desired D2D operation in particular, even if the radio network node itself is not directly participating in direct D2D communications as another wireless device.

Using conventional systems and methods, wireless devices 20 can only discover other wireless devices that are capable of and/or are interested in D2D communications. However, wireless devices 20 remain unaware of radio network nodes that can support D2D operations between wireless devices 20. Knowing D2D related information about network nodes is of particular importance for network-assisted D2D operations between wireless devices 20. Hence, there is a need for methods or apparatuses for signaling or supporting D2D related information about network nodes (e.g., radio network nodes). Moreover, there is a need for obtaining or using D2D related information about nodes (e.g., network nodes) to perform mobility operations such as de-selecting nodes that are incapable of performing D2D operations and selecting or reselecting nodes that are capable of, or support, D2D operations or services.

In this regard, systems and methods are disclosed herein that enable nodes such as wireless devices 20 or network nodes (i.e., a core network 14, a base station 16, or a SGW/PGW 18) in the cellular communications system 10 to obtain and/or use D2D related information to perform mobility operations when advantageous, desired, or necessary. Thus, the disclosed systems and methods use D2D related information to perform mobility operations for wireless devices 20 in the cellular communications system 10. This improves usage of network radio resources and reduces D2D performance degradation.

In contrast, conventional cellular systems use speed-dependent cell selection mechanisms that do not account for D2D communications. In particular, conventional systems consider the communication speed of only a single wireless device for cell selection. The present disclosure, however, describes some embodiments that consider the behavior of at least two D2D-capable wireless devices for cell selection.

Figure 5:
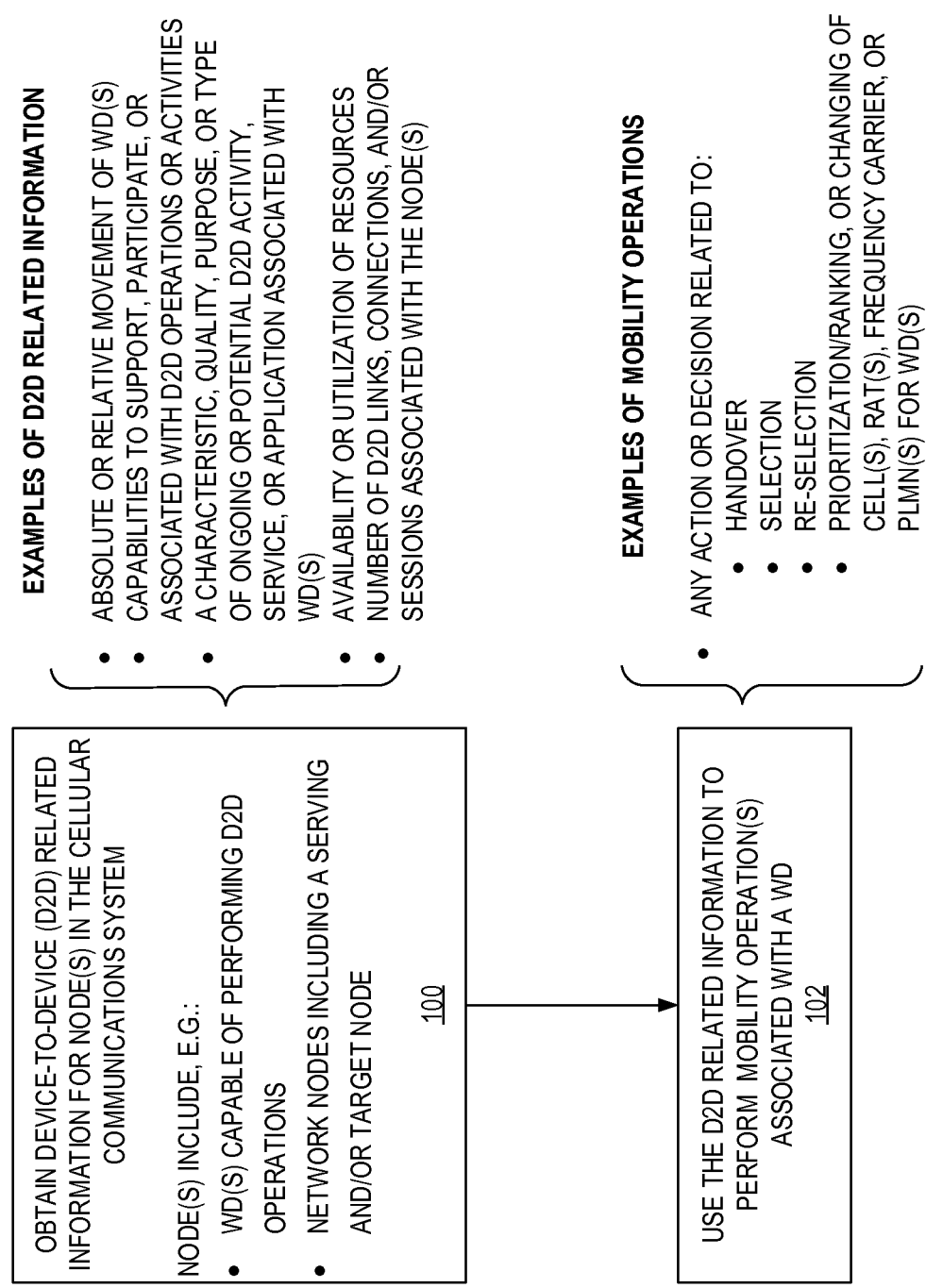
FIG. 5 is a flow chart that illustrates the operation of a node to obtain D2D related information of one or more other nodes, and use the D2D related information to perform mobility operations according to some embodiments of the present disclosure.

FIG. 5 is a flow chart that illustrates the operation of one or more nodes to obtain D2D related information for one or more nodes and use the D2D related information according to some embodiments of the present disclosure. The node performing this process may be a network node (e.g., a radio access node such as, for example, the base station 16, a core network node such as, for example, a Mobility Management Entity (MME), or the like) or a wireless device 20. First, the node obtains D2D related information for one or more nodes in the cellular communications system 10 (step 100). The one or more nodes may include the node itself and/or one or more other nodes. For example, the one or more nodes may include wireless devices that are capable of performing D2D operations and/or network nodes. The network node(s) may include radio network node(s) and/or network node(s) other than radio network node(s). Some examples of a radio network node are a radio base station, a relay node, an access point, a cluster head, a Radio Network Controller (RNC), etc. The radio network node is comprised in a wireless communications network and may also support cellular operation. Some examples of a network node that is not a radio network node include a core network node, a MME, a node controlling at least in part mobility of a wireless device, a Self-Organizing Network (SON) node, an Operations and Management (O&M) node, a positioning node, a server, an application server, a D2D server (which may be capable of some but not all D2D related features), an external node, or a node comprised in another network.

In some embodiments, the node(s) for which the D2D related information is obtained include a node controlling a serving cell and/or a node controlling a target cell for a wireless device 20. This wireless device 20 is the wireless device 20 for which a mobility operation(s) are performed in step 102 discussed below.

In some embodiments, the wireless device 20 for which a mobility operation(s) is to be performed is referred to as a first wireless device 20, and the obtained D2D related information may include D2D related information associated with one or more of: the first wireless device 20, at least one second wireless device 20 (e.g., a wireless device 20 that is involved or may be involved in a D2D operation with the first wireless device 20), a first radio network node (e.g., a base station 16 of a cell serving the first wireless device 20), and a second radio network node (e.g., a base station 16 of a target cell for a (potential) handover of the first wireless device 20).

Examples of D2D related information for a node may include combinations of information related to D2D capabilities, characteristics, resources, utilization, sessions, physical movement, or the like.

More specifically, in some embodiments, the D2D related information for, or associated with, a node (e.g., a wireless device 20 or a network node such as, for example, a base station 16) may include, e.g., any one or combination of:

D2D related capability (see below) of the node;
for embodiments where the mobility operation(s) are performed for a first wireless device 20 and the D2D related information is obtained for one or more nodes including a second wireless device 20:
- a characteristic, quality (actual, desired, or expected/predicted), purpose or a type of an on-going D2D activity, D2D service, or D2D application, in which the first wireless device 20 and/or the second wireless device 20 is involved (e.g., D2D discovery; D2D communication; D2D broadcast communication, D2D group communication, or D2D unicast communication; D2D communication for public safety; D2D application identity; type of radio signal/channel associated with a D2D activity transmitted or received by the first wireless device 20; etc.);
- a characteristic, quality (actual, desired, or expected/predicted), purpose, or a type of a D2D activity, D2D service, or D2D application, in which the first wireless device 20 and/or the second wireless device 20 needs to be involved (e.g., requesting or being requested) or may potentially be involved;
- movement characteristics of the second wireless device 20 (e.g., absolute speed, relative speed with respect to a reference speed or the speed of the first wireless device 20, direction, acceleration, etc.); and
- relative movement characteristics of the first wireless device 20 with respect to the second wireless device 20 (e.g., relative speed, relative direction, etc.);
- availability of a sufficient amount of time-frequency resources or availability of time-frequency resources according to a specific configuration desired/needed for D2D operation, e.g.:
  - 20% or 60% of all time-frequency resources which may be dedicated for D2D operation, where some examples of time-frequency resources are subframes on a certain radio frequency within a certain bandwidth, a certain portion of resource blocks, etc.; or
  - subframes according to a certain time-domain pattern (e.g., subframe #2 in each radio frame, at least one subframe in each radio frame, at least one subframe with periodicity of X milliseconds (ms), etc.);
- utilization or load on D2D radio resources associated with the node in question (e.g., load on uplink subframes in a TDD cell used for D2D communication); and
- number of D2D sessions or number of devices involved in D2D operation already supported by the node in question (e.g., number of D2D sessions within coverage of a cell associated with the node).

D2D related capabilities of a node (e.g., a wireless device 20 or a network node such as, for example, a base station 16) may include, e.g., one or more of the following:
- the node's ability to support, assist a device (e.g., a wireless device 20) in, or be engaged in one or more D2D activities (e.g., transmitting radio signals or channels associated with D2D operation such as D2D synchronization signals or channels in the uplink spectrum or D2D control channels or D2D data channels; providing to a wireless device 20 assistance data related to D2D operation; broadcasting data associated with D2D operation; providing control data associated with D2D operation to a wireless device 20 and/or a network node; supporting D2D communication; supporting D2D discovery; ability to operate as a D2D controlling node or a D2D cluster head for one or more wireless devices 20);
- the node's ability to support, assist a device in, or be engaged in one or more D2D activities on a certain carrier frequency or in a certain frequency band;
- the node's ability to support, assist a device in, or be engaged in one or more D2D activities in one or more specific RATs (e.g., FDD LTE, TDD LTE, WCDMA, GSM, CDMA, WiMAX, WLAN, etc.);
- the node's ability to support, assist a device in, or be engaged in one or more D2D activities within a certain bandwidth;
- the node's ability to support, assist a device in, or be engaged in one or more D2D activities of a certain type, for a certain purpose, for a certain application, or for a certain service type (e.g., for public safety; for commercial use; for virtual money bank operation; for voice service; supporting at least broadcast D2D communication; supporting at least D2D group communication; supporting at least D2D unicast communication; supporting at least D2D discovery; advanced mode of D2D operation (compared to a basic mode of D2D operation, i.e., with a more restricted functionality); etc.);
- the node's ability to support, assist a device in, or be engaged in one or more D2D activities for a certain type of wireless devices 20 or wireless devices 20 with certain characteristics (e.g., wireless devices 20 of a certain category or of a certain power class);
- the node's ability to support a certain type of scheduling for D2D activities (e.g., dynamic D2D data scheduling, semi-persistent D2D data scheduling, etc.);
- the number of D2D links, D2D connections, or D2D sessions a network node may be able to handle (particularly in network-assisted D2D operation); and
- the node's ability to obtain another node's D2D related capability or provide the node's own or another node's D2D related capability.

The D2D related information for the one or more nodes can be obtained in any suitable manner.

As discussed above, in some embodiments, the node that obtains the D2D related information is a network node (e.g., a radio network node such as, for example, a base station 16), and the node(s) for which the D2D related information is obtained include the first wireless device 20 and/or at least one second wireless device 20. The D2D related information associated with a wireless device 20 (e.g., the first wireless device 20 and/or the at least one second wireless device 20) may be obtained by the network node by different means, e.g., by:
- higher-layer signaling (e.g., Radio Resource Control (RRC) or Secure User Plane Location (SUPL) protocol) received from the wireless device 20 itself, another network node (e.g., a radio network node controlling a serving cell of the wireless device 20 or a radio network node controlling a target cell of the wireless device 20) or another wireless device 20;
- physical layer signaling (e.g., an indication bit on a physical channel) received from the wireless device 20 itself, another network node (e.g., a radio network node controlling a serving cell of the wireless device 20 or a radio network node controlling a target cell of the wireless device 20), or another wireless device 20;
- reading data (e.g., from an internal database, subscription configuration, history data, predefined or pre-configured configuration, etc.);
- reading data from an external database or media;
- determining based on performing one or more radio measurements, e.g.:

if a known radio signal associated with D2D operation is transmitted by the wireless device 20, it may be determined that the wireless device 20 is capable of performing at least some D2D operations; and determining a movement characteristic of the wireless device 20 based on sensor measurements or radio measurements;

determining based on a predefined rule (e.g., by applying a rule to an identity associated with the wireless device 20 to determine whether the identity belongs to a set associated with D2D); and/or determining based on reading the information broadcasted by the wireless device 20, wherein the information comprises the D2D related information of the wireless device 20.

As discussed above, in some embodiments, the node that obtains the D2D related information is a network node (e.g., a radio network node such as, for example, a base station 16), and the node(s) for which the D2D related information is obtained include a radio network node (e.g., the radio network node controlling a serving cell of a wireless device 20 for which the mobility operation(s) are to be performed and/or a radio network node controlling a target cell of the wireless device 20 for which mobility operation(s) are to be performed). The D2D related information associated with a network node (e.g., a radio network node such as, for example, a base station 16 controlling the serving or target cell of the wireless device 20 for which the mobility operation(s) are to be performed) may be obtained by the network node by different means, e.g., by:

signaling received via a wireless device 20 or from another network node (e.g., via X2);

from a SON or an O&M node;

reading data (e.g., from an internal database, subscription configuration, history data, predefined or pre-configured configuration, etc.);

reading data from an external database or media;

determining based on performing one or more radio measurements, e.g., a measurement associated with D2D performed and reported by a radio network node to the (obtaining) node implies that the radio network node supports D2D operation;

determining based on a predefined rule (e.g., by applying a rule to an identity associated with a radio network node to determine whether the identity belongs to a set associated with D2D); and/or determining based on reading the information broadcasted by a radio network node, wherein the information comprises the D2D related information of the radio network node.

As discussed above, in some embodiments, the node that obtains the D2D related information is a wireless device 20 (e.g., the wireless device 20 for which the mobility operation(s) are to be performed (or by which the mobility operation(s) are to be performed)), and the node(s) for which the D2D related information is obtained include a wireless device 20 (e.g., the first wireless device 20 and/or at least one second wireless device 20). The D2D related information associated with a wireless device 20 (e.g., the first wireless device 20 and/or the at least one second wireless device 20) may be obtained by the wireless device 20 by different means, e.g., by:

higher-layer signaling received from the wireless device 20 itself, a network node (e.g., a radio network node controlling a serving cell of the wireless device 20 or a radio network node controlling a target cell of the wireless device 20) or another wireless device 20 (e.g., forwarding);

physical layer signaling (e.g., an indication bit on a physical channel) received from the wireless device 20 itself, a network node (e.g., a radio network node controlling a serving cell of the wireless device 20 or a radio network node controlling a target cell of the wireless device 20), or another wireless device 20;

reading data (e.g., from an internal database, subscription configuration, history data, predefined or pre-configured configuration, etc.);

reading data from an external database or media;

determining based on performing one or more radio measurements, e.g.:

if a known radio signal associated with D2D operation is transmitted by the wireless device 20, it may be determined that the wireless device 20 is capable of performing at least some D2D operations; and determining a movement characteristic of the wireless device 20 based on sensor measurements or radio measurements;

determining based on a predefined rule (e.g., by applying a rule to an identity associated with the wireless device 20 to determine whether the identity belongs to a set associated with D2D); and/or determining based on reading the information broadcasted by the wireless device 20, wherein the information comprises the D2D related information of the wireless device 20.

As discussed above, in some embodiments, the node that obtains the D2D related information is a wireless device 20 (e.g., the wireless device 20 for which the mobility operation(s) are to be performed (or by which the mobility operation(s) are to be performed)), and the node(s) for which the D2D related information is obtained include a network node (e.g., a radio network node controlling a serving cell of a wireless device 20 for which the mobility operation(s) are to be performed and/or a radio network node controlling a target cell of a wireless device 20 for which the mobility operation(s) are to be performed). The D2D related information associated with a network node (e.g., a radio network node controlling a serving cell of a wireless device 20 for which the mobility operation(s) are to be performed and/or a radio network node controlling a target cell of a wireless device 20 for which the mobility operation(s) are to be performed) may be obtained by the wireless device 20 by different means, e.g., by:

If the network node is a radio network node:

higher-layer signaling received from the radio network node, a network node, or another wireless device 20;

physical layer signaling (e.g., an indication bit on a physical channel) received from the radio network node or another wireless device 20;

determining based on performing one or more radio measurements, e.g., a measurement associated with D2D performed and reported by the radio network node to the (obtaining) network node implies that the radio network node supports D2D operation;

determining based on a predefined rule (e.g., by applying a rule to an identity associated with the radio network node to determine whether the identity belongs to a set associated with D2D); and determining based on reading the information broadcasted by the radio network node, wherein the information comprises the D2D related information of the radio network node reading data (e.g., from an internal database, subscription configuration, history data predefined or pre-configured configuration, etc.); and/or reading data from an external database or media.

As discussed above, in some embodiments, the node that obtains the D2D related information is a wireless device 20 (e.g., the wireless device 20 for which the mobility operation(s) are to be performed (or by which the mobility operation(s) are to be performed)), and the node(s) for which the D2D related information is obtained include a radio network node (e.g., a radio network node controlling a serving cell of a wireless device 20 for which the mobility operation(s) are to be performed and/or a radio network node controlling a target cell of a wireless device 20 for which the mobility operation(s) are to be performed). The D2D related information associated with the radio network node may then include, in some embodiments, D2D related capability information for the radio network node, which may be obtained by the wireless device 20 by different means, e.g., by:

- higher-layer signaling (e.g., RRC or SUPL protocol) from the radio network node itself, another network node, or another wireless device 20 (e.g., forwarding the radio network node's capability or signaling the obtained capability of a radio network node), wherein the capability may be explicitly indicated or comprised implicitly, e.g., via broadcast, multicast or dedicated signaling:
  - the signaling node (i.e., the node that signals the D2D related capability information of the radio network node to the wireless device 20) may signal its own D2D related capability or another, typically adjacent or nearby, node's capability. In one example, the signaling node may provide to the wireless device 20 a list of radio network nodes in its neighborhood that have one or more D2D capabilities, where the list may comprise identities associated with the radio network nodes or cells. In another example, the signaling node may provide to the wireless device 20 a list of radio network nodes in its neighborhood that do not have a certain D2D capability, where the list may comprise identities associated with the radio network nodes or cells; and
  - in yet another example, the D2D related capability information or an indication may be comprised in node-specific, cell-specific, or system-specific information (e.g., System Information (SI)) signaled (e.g., broadcasted via a physical broadcast channel) by the radio network node;
- physical layer signaling (e.g., an indication bit on a physical channel) from the radio network node itself, another network node, or another wireless device 20 (the capability may be explicitly indicated or comprised implicitly), e.g., via broadcast, multicast, or dedicated signaling;
- reading data stored or pre-configured in the wireless device 20 (e.g., from an internal database, subscription configuration, etc.);
- reading from an external database or media;
- determining based on performing one or more radio measurements on one or more known radio signals, e.g.:
  - if a known radio signal associated with D2D operation is transmitted by the radio network node, it may be assumed that the radio network node has one or more of the D2D related capabilities; and
  - searching for synchronization signals indicative of D2D related capability (e.g., extended synchronization sequences such as Primary Synchronization Signal (PSS) and/or Secondary Synchronization Signal (SSS) sequences used for D2D operations in the downlink or uplink spectrum). In an explicit example, SSS subsequence combinations currently not allocated may be used for signaling certain network node D2D capability. Hence in this case, the wireless device 20 not only determines the cell group but also actual D2D capability for that particular node. In one embodiment, the extended SSSs are transmitted in certain subframes (i.e., as extensions to legacy PSS/SSS); and/or
- determining based on a predefined rule (e.g., by applying a rule to an identity associated with the radio network node when it is predefined that a certain set of identities is associated with/reserved for radio network nodes having D2D related capability).

Regardless of how the D2D related information for the node(s) is obtained, the node then uses the obtained D2D related information to perform one or more mobility operations for a wireless device 20 (step 102). For instance, if again the wireless device 20 is the first wireless device 20, the node performs one or more mobility operations for the first wireless device 20 based on the D2D related information associated with one or more of: the first wireless device 20, at least one second wireless device 20 (e.g., a wireless device 20 that is involved or may be involved in a D2D operation with the first wireless device 20), a first radio network node (e.g., a base station 16 of a cell serving the first wireless device 20), and a second radio network node (e.g., a base station 16 of a target cell for a (potential) handover of the first wireless device 20).

The one or more mobility operations include any procedure(s) related to handover or involving selection, reselection, prioritization/ranking, or changing, of cell(s), RAT(s), frequency carrier, or PLMN(s) for one or more wireless devices 20, or any action or decision related to such procedures (e.g., measurement control for the purpose of cell change or handover, handover decision, assistance data provisioning to assist a cell change, handover, connection control, etc.). A mobility operation may be performed on, e.g., a wireless device(s) in a connected state, on a wireless device(s) in an idle state, on wireless device(s) attempting a network connection, or on wireless device(s) recovering from a connection loss.

FIGS. 6 through 10 illustrate methods of obtaining D2D related information of one or more nodes (e.g., wireless devices 20 or radio network nodes, e.g., base stations 16) according to some embodiments of the present disclosure. The embodiments illustrated by FIGS. 6 through 10 are examples of some of the embodiments described above in which the D2D related information is obtained via, e.g., any combination of signaling, reading stored data, by performing radio measurements, based on predefined rules, based on broadcast information, or the like.

Figure 6:
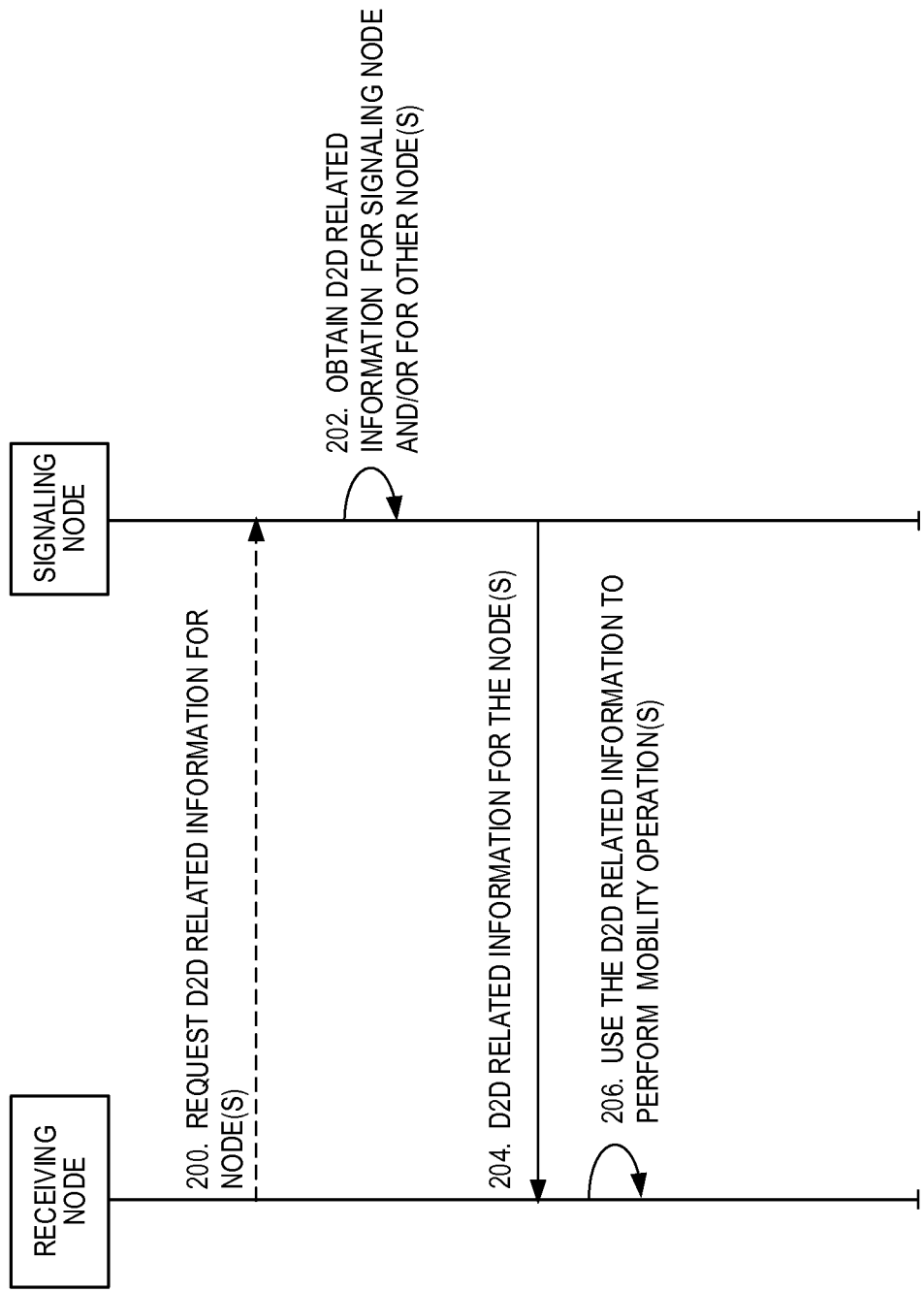
FIG. 6 is a flow chart that illustrates a node that obtains D2D related information of one or more network nodes via signaling according to some embodiments of the present disclosure.

More specifically, FIG. 6 illustrates an embodiment in which a node (e.g., a wireless device 20 or a network node) obtains D2D related information of one or more other nodes (e.g., a wireless device 20 or a network node) via signaling according to some embodiments of the present disclosure. As illustrated, a receiving node may request D2D related information about one or more nodes from a signaling node (e.g., a radio network node, e.g., a base station 16) (step 200). In some embodiments, the receiving node is the node that desires to perform the mobility operation(s), but is not limited thereto. Note that step 200 is optional. Either prior to or in response to the request (or at any suitable time in embodiments in which there is no request), the signaling node obtains D2D related information for (i.e., about) the signaling node and/or for other nodes (e.g., other radio network nodes, core network nodes, or the like) (step 202). The D2D related information may be obtained using, e.g., any of the embodiments described above (e.g., signaling from another node(s), reading from internal or external storage, determining based on measurement(s), determining based on predefined rule(s), etc.). The obtained D2D related information for the one or more nodes may then be transmitted or signaled to the receiving node (step 204). Finally, the D2D related information may then be used by the receiving node to perform one or more mobility operations, as discussed above (step 206).

Figure 7:
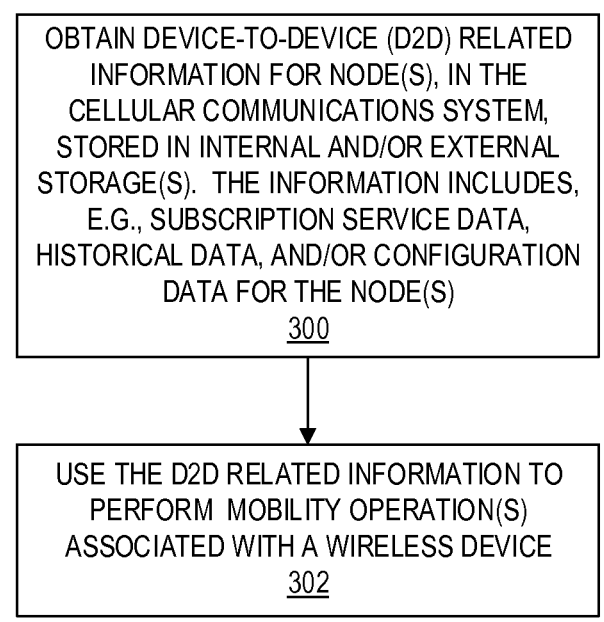
FIG. 7 is a flow chart that illustrates obtaining D2D related information of one or more nodes by reading corresponding data from internal and/or external storage according to some embodiments of the present disclosure.

FIG. 7 illustrates an embodiment in which a node obtains D2D related information of one or more nodes by reading corresponding data from an internal storage and/or an external storage according to some embodiments of the present disclosure. As illustrated, a node (e.g., a wireless device 20 or a network node) may obtain D2D related information of one or more nodes by reading corresponding data from an internal storage of the node and/or an external storage accessible to the node (step 300). The D2D related information may be stored in any combination of internal or external databases, memories, media, remote servers, or other nodes. In some embodiments, the content of the stored information may include any combination including at least one of subscription service data, historical data, configuration data for the nodes, or the like. The node then uses the D2D related information to perform one or more mobility operations, as described above (step 302).

Figure 8:
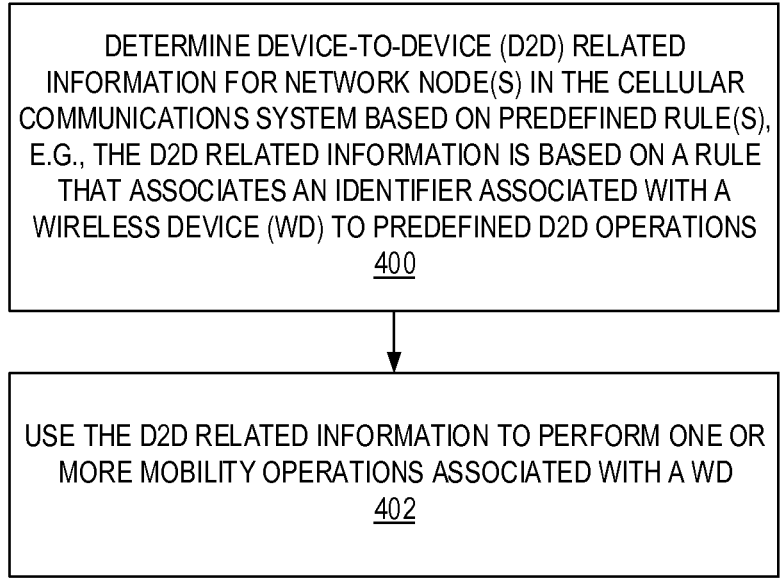
FIG. 8 is a flow chart that illustrates obtaining D2D related information of one or more nodes based on one or more predefined rules according to some embodiments of the present disclosure.

Network nodes may also obtain D2D related information of one or more nodes based on one or more predefined rules, as shown in FIG. 8. As illustrated, a node determines D2D related information of one or more nodes based on one or more predefined rules (step 400). Examples include applying a rule to an identifier associated with a network node or a wireless device 20 to determine whether the network node or the wireless device 20 is associated with D2D operations (e.g., determine whether the identifier belongs to a predetermined set of identities associated with D2D operations). The node then uses the determined D2D related information to perform one or more mobility operations for a wireless device 20, as described above (step 402).

D2D related information associated with network nodes (e.g., radio network nodes 16) may also be obtained by reading information broadcast by one or more nodes (e.g., radio network nodes, e.g., base stations 16). In some embodiments, the broadcast information includes D2D related information of, for example, radio network nodes, e.g., base stations 16.

Figure 9:
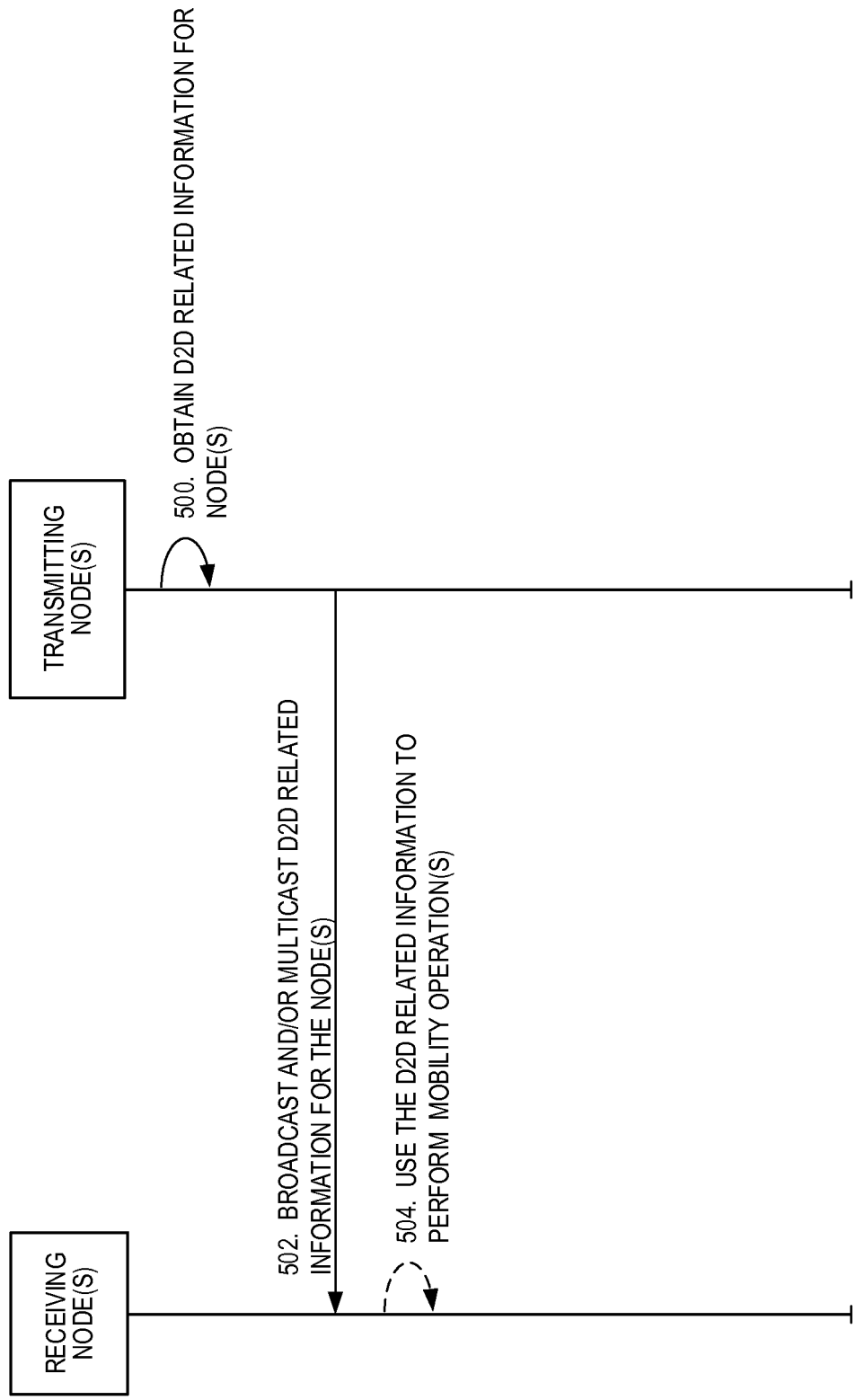
FIG. 9 is a flow chart that illustrates obtaining D2D related information of one or more nodes via broadcast and/or multicast signals from the one or more nodes according to some embodiments of the present disclosure.

FIG. 9 is a flow chart showing D2D related information obtained by a node via broadcast and/or multicast signals, as detailed above. In some embodiments, the broadcasting node may be a radio access node, e.g., a base station 16, and the receiving node may be a wireless device 20. However, the transmitting and receiving nodes may be any type of node that receives and/or transmits broadcast or multicast signals.

As illustrated, a transmitting node (e.g., a radio network node, e.g., a base station 16) may obtain its own D2D related information and/or D2D related information for one or more other nodes (step 500). The transmitting node then broadcasts and/or multicasts the obtained D2D related information (step 502). Lastly, one or more receiving nodes receive the broadcast/multicast and may use the obtained D2D related information to perform one or more mobility operations (step 504).

D2D related information of one or more radio network nodes may be obtained by performing one or more radio measurements on or for a signal(s) transmitted by the radio network node(s). The one or more signals on or for which the measurement(s) are made may be signals associated with D2D operations. One or more measurement results determined by the node may be reported therefrom to one or more network nodes for use to perform one or more mobility operations. For example, the reported results may indicate which radio network node, e.g., base station 16, supports D2D operations. A wireless device 20 can then perform a handover, selection, or reselection operation to a radio network node, e.g., a base station 16, that controls the cell which supports the D2D operations.

Figure 10:
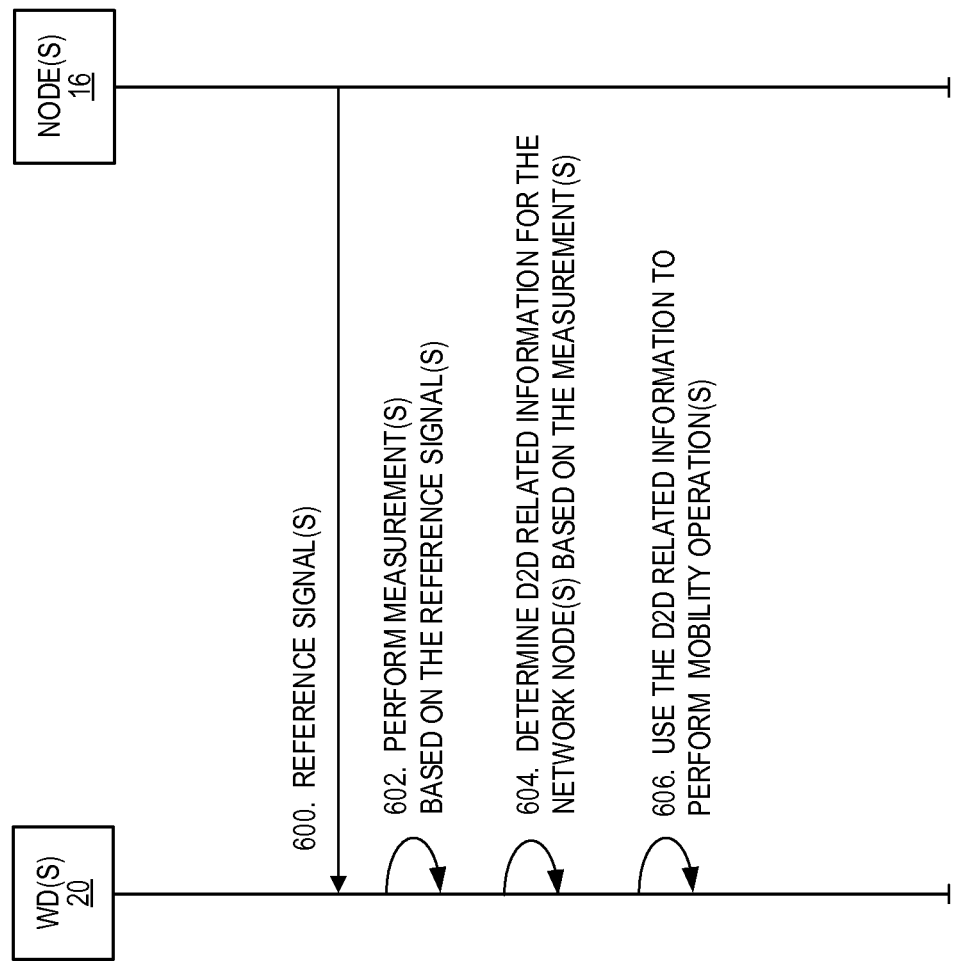
FIG. 10 is a flow chart that illustrates obtaining D2D related information of one or more nodes based on one or more measurements on one or more nodes according to some embodiments of the present disclosure.

FIG. 10 is a flow chart that shows using measurements information to obtain D2D related information for performing a mobility operation to a suitable neighboring cell. In this example, one or more wireless devices 20 obtain the D2D related information based on measurements of known signals (e.g., reference or pilot signals). However, this process may be used by other network nodes (e.g., radio network nodes) to determine D2D related information of other nodes based on measurements of known signals.

As illustrated, one or more reference signals are transmitted from one or more nodes (e.g., radio network nodes, e.g., base stations 16) (step 600). The wireless devices 20 perform measurements based on the reference signals (step 602). Based on the measurements, the wireless devices 20 determine D2D related information for the transmitting nodes (step 604). Thus, for example, a wireless device 20 may perform measurements to determine whether a particular known radio signal associated with a D2D operation or service is transmitted by one or more radio network nodes. If so, for example, the wireless device 20 may determine that the one or more radio network nodes has one or more predefined (e.g., preconfigured) D2D related capabilities. The wireless device 20 can then perform a handover, selection, or reselection operation to a radio network node, e.g., a base station 16, which controls the cell which supports the D2D operations (step 606).

Figure 11A:
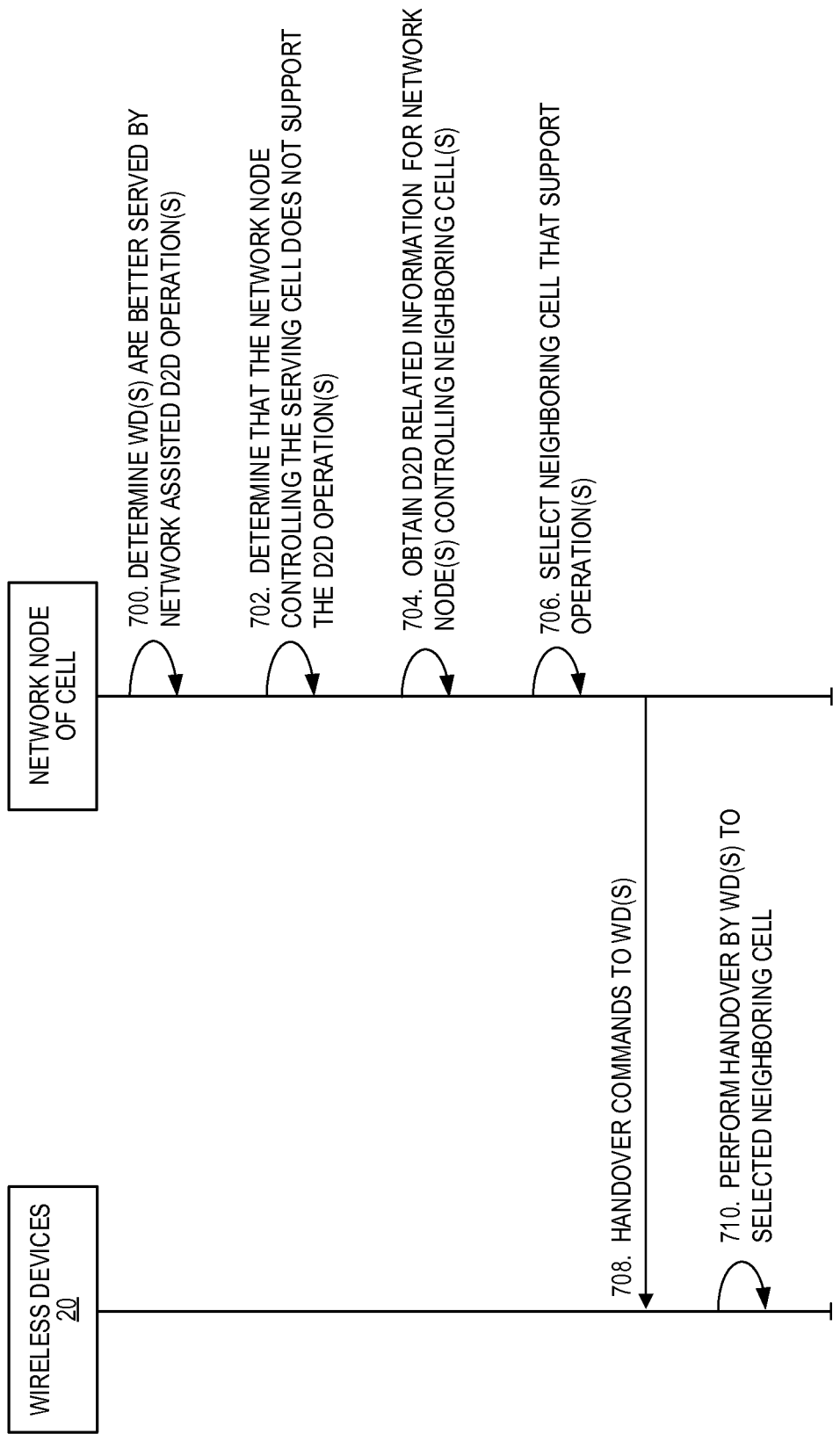
FIG. 11A is a flow chart that illustrates a network node embodiment for performing a mobility operation when one or more active wireless devices can be better served by network-assisted D2D operations that are not supported by a current serving cell according to some embodiments of the present disclosure.
Figure 11B:
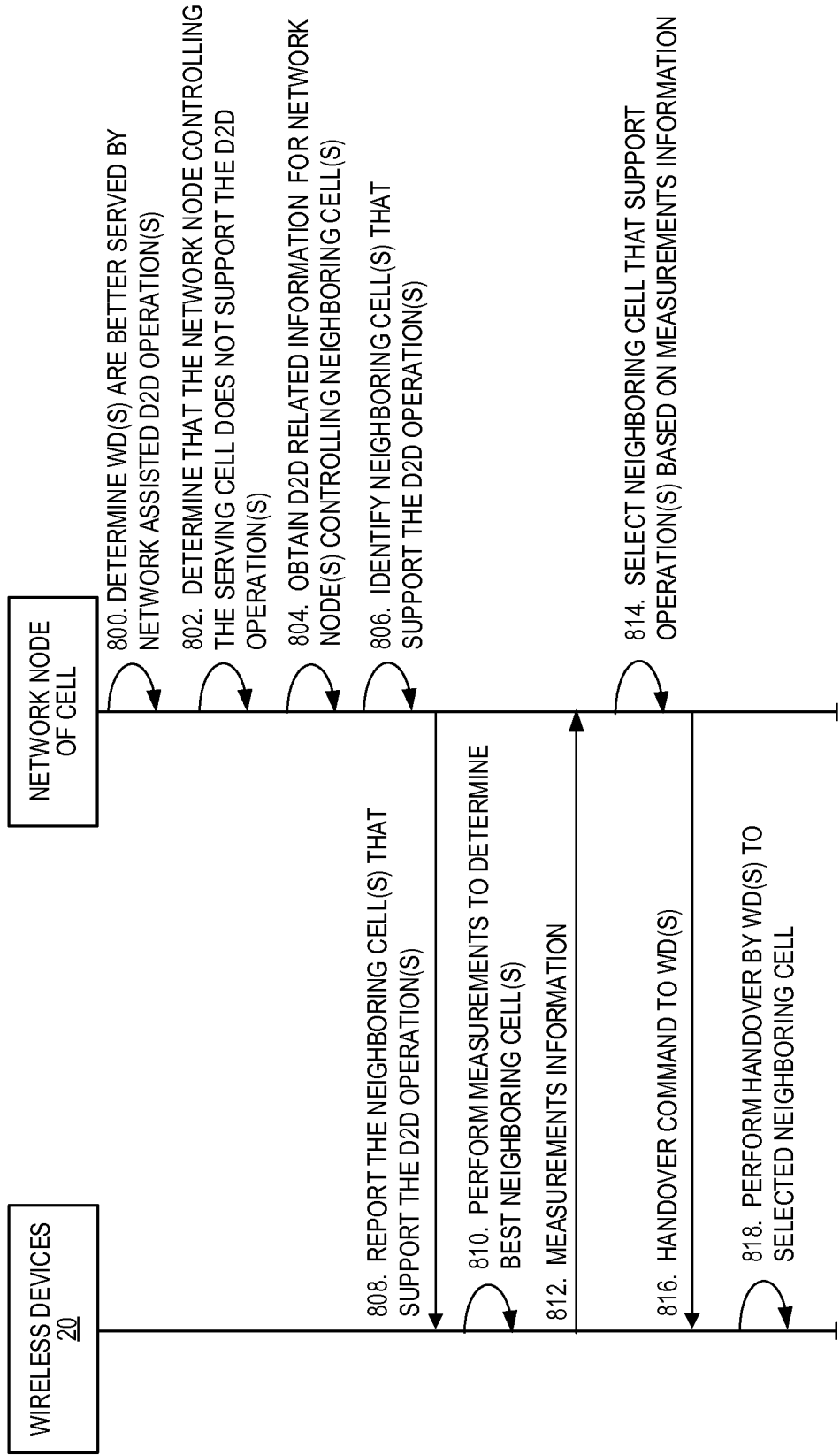
FIG. 11B is a flow chart that illustrates the network node embodiment of FIG. 11A, but further uses measurement information performed at the wireless devices to determine the D2D related information used to perform the mobility operation according to some embodiments of the present disclosure.

FIGS. 11A, 11B, 12A, 12B, and 13 illustrate some particular implementations of embodiments of the present disclosure. In particular, FIGS. 11A and 11B illustrate embodiments in which a network node obtains D2D related information and performs a mobility operation(s) for two wireless devices 20 in active mode. That is, the wireless devices 20 of FIGS. 11A and 11B may be in an active (connected) mode or state. For example, a first wireless device 20 and a second wireless device 20 may both be connected to the same serving cell controlled by a network node (e.g., a radio network node, e.g., a base station 16). First, the network node controlling a serving cell of the first and second wireless devices 20 determines that the first and second wireless devices 20 may benefit or be better served by one or more network-assisted D2D operations (steps 700, 800). The network node determines that its corresponding cell (i.e., the serving cell of the first and second wireless devices 20) does not support the D2D operations (steps 702, 802). The network node also obtains D2D related information of network nodes that control neighboring cells (steps 704, 804). The D2D related information may be obtained in any suitable manner such as, for example, any one or a combination of the embodiments for obtaining D2D related information of other network nodes described above. The neighboring cells may include inter-frequency and/or inter-RAT cells.

In the embodiment of FIG. 11A, the network node selects one of the neighboring cells that support the D2D related operations as a target cell for a handover of the first and second wireless devices 20 and sends corresponding handover commands to the first and second wireless devices 20 (steps 706 and 708). Lastly, the first and second wireless devices 20 perform corresponding handovers to the selected neighboring cell (step 710).

Unlike FIG. 11A, in the embodiment of FIG. 11B, the network node identifies one or more of the neighboring cells that have the requisite D2D capabilities by using the D2D related information of the network node(s) controlling the neighboring cell(s) (step 806). The network node reports the identified neighboring cells to the first and second wireless devices 20 (step 808). The first and second wireless devices 20 perform measurements to determine the best (i.e., most suitable) neighboring cell(s) and report the resulting measurements information to the network node (steps 810 and 812). Then, similar to the embodiment of FIG. 11A, the network node selects a neighboring cell(s) (step 814) and sends corresponding handover command to the first and second wireless devices 20 (step 816). The first and second wireless devices 20 then perform corresponding handovers to the selected neighboring cell (step 818).

Thus, in either of the embodiments of FIGS. 11A and 11B, once a suitable cell for the requested D2D service has been determined, the network node issues a handover command to the first and second wireless devices 20 to handover to the suitable cell, and the first and second wireless devices 20 may then handover to that suitable cell. In some embodiments, the handovers of the first and second wireless devices 20 are performed to the same cell. In some embodiments, the handovers of the first and second wireless devices 20 are to different cells that both support the requested D2D service.

In some embodiments, a network node obtains D2D related information and performs a mobility operation(s) for a wireless device 20 in an active mode that is requesting a D2D service. In some embodiments, the wireless device 20 is in RRC_CONNECTED mode with reference to a serving cell. The network node receives a request from the wireless device 20 (or from another node or a second wireless device 20 connected to the serving cell of the wireless device 20) about a need for a specific D2D service. In this example, the network node does not support D2D operation, or at least does not support the requested D2D service and, therefore, cannot immediately acknowledge the service request for the wireless device 20. Instead, the network node may determine D2D capabilities of adjacent or neighboring cells on the same and/or a different frequency such as, for example, inter-frequency/inter-RAT cells. The determination may be done as described above. Once a suitable cell for the requested D2D service has been determined, the network node may send a command, such as a handover command, to the wireless device 20 to perform handover to the determined cell. The wireless device 20 may then start a handover operation to that determined cell. In another embodiment, multiple suitable cells supporting the requested D2D service are determined, and the information is fed to the wireless device 20 so that the wireless device 20 can then perform Radio Resource Management (RRM) measurements for finding the best suitable cell for the handover. The measurement report, including measurements for at least one cell from the multiple suitable cells, can then be sent to the network node, which can then proceed to determine the best cell for the handover for the wireless device 20. The wireless device 20 may then handover to the determined cell.

Figure 12A:
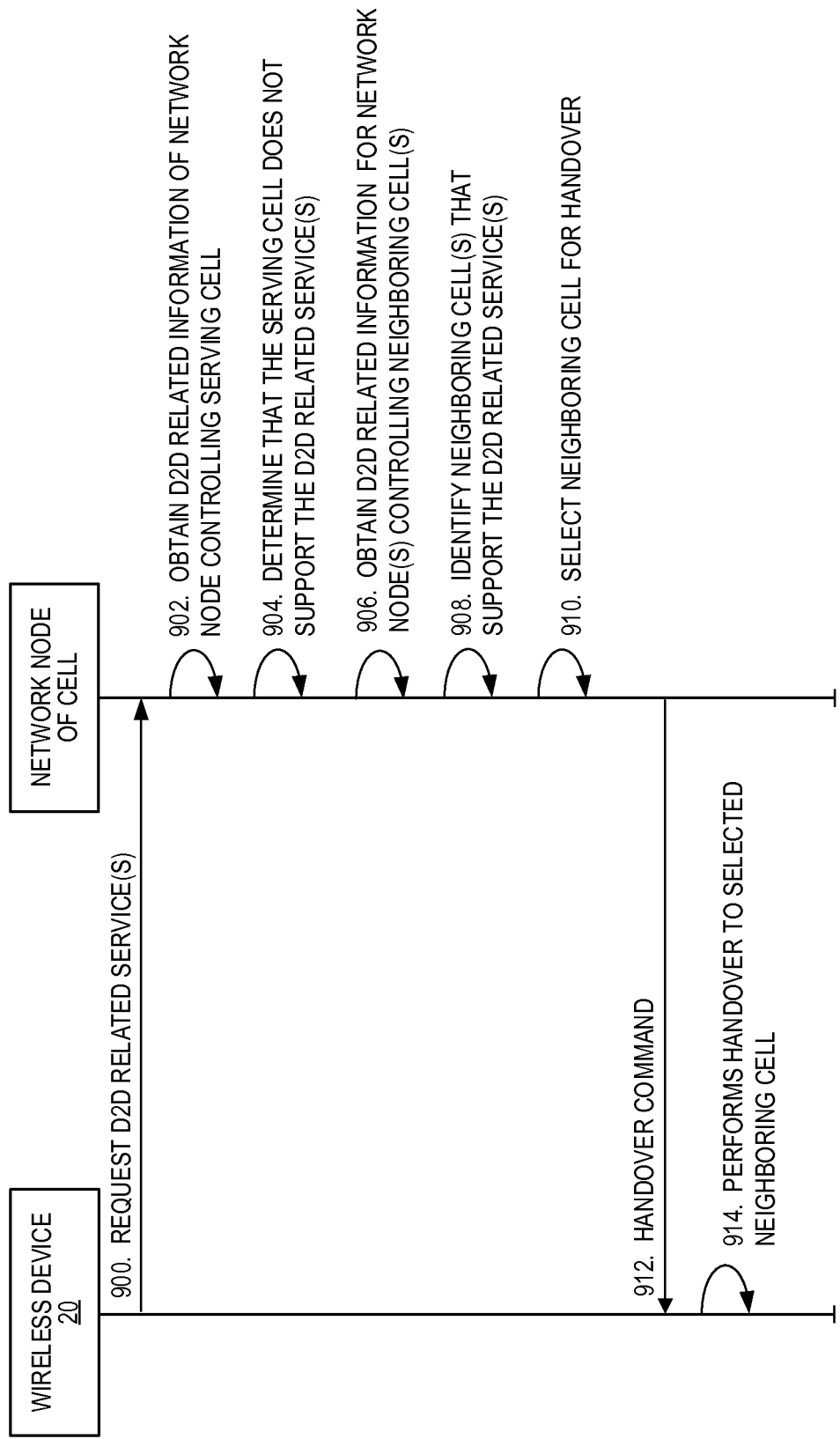
FIG. 12A is a flow chart that illustrates a network node embodiment for performing a mobility operation when an active wireless device requests D2D related services that are not supported by a current serving cell according to some embodiments of the present disclosure.
Figure 12B:
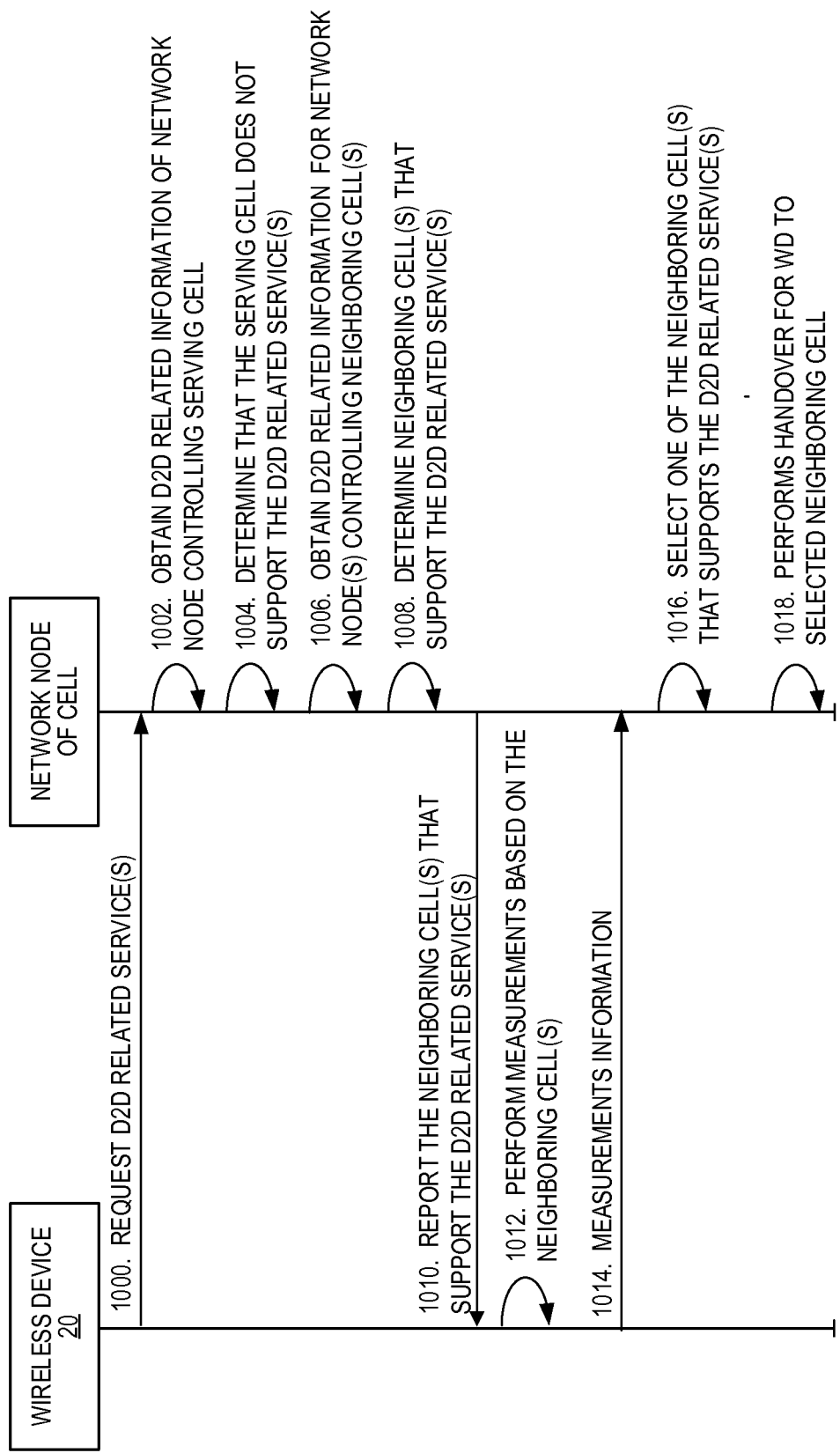
FIG. 12B is a flow chart that illustrates the network node embodiment of FIG. 12A, but further uses measurement information performed at the wireless device to determine the D2D related information used to perform the mobility operation according to some embodiments of the present disclosure.

FIGS. 12A and 12B illustrate example implementations of these embodiments. As illustrated in FIG. 12A, the wireless device 20 requests D2D related services from a network node (e.g., a radio network node, e.g., a base station 16) that controls the serving cell of the wireless device 20 (step 900). The network node obtains the D2D related information for the serving cell (step 902). Based on the D2D related information for the serving cell, the network node determines that the serving cell does not support the requested D2D related services (step 904). In addition, the network node obtains D2D related information for one or more nodes that control respective one or more neighboring cells of the serving cell (step 906). Using this D2D related information, the network node identifies one or more neighboring cells that support the requested D2D related service(s) (step 908). In some embodiments, multiple suitable cells that support the requested D2D service may be identified. The network node selects one of the one or more identified neighboring cells for a handover operation (step 910). The network node sends a handover command to the wireless device 20 for the selected neighboring cell (step 912). Lastly, the wireless device 20 performs a handover to the selected neighboring cell (step 914).

In the embodiment of FIG. 12B, the wireless device 20 requests D2D related services from a network node (e.g., a radio network node, e.g., a base station 16) that controls the serving cell of the wireless device 20 (step 1000). The network node obtains the D2D related information for the serving cell (step 1002). Based on the D2D related information for the serving cell, the network node determines that the serving cell does not support the requested D2D related services (step 1004). In addition, the network node obtains D2D related information for one or more nodes that control respective one or more neighboring cells of the serving cell (step 1006). Using this D2D related information, the network node determines, or identifies, one or more neighboring cells that support the requested D2D related service(s) (step 1008). In some embodiments, multiple suitable cells that support the requested D2D service may be identified. The network node reports the neighboring cell(s) that supported the requested D2D related service(s) to the wireless device 20 (step 1010). The wireless device 20 then performs measurements on those neighboring cell(s) (step 1012) and reports the resulting measurements information to the network node (step 1014). Using the reported measurements information, the network node selects one of the neighboring cells for a handover operation (step 1016). The network node then performs the handover (step 1018) by, e.g., sending a corresponding handover command to the wireless device 20 for the selected neighboring cell.

In some embodiments, a wireless device 20 in idle mode camping on a cell uses D2D related information to perform cell reselection, if needed, upon detecting that D2D service(s) are needed. In general, a D2D capable wireless device 20 is camping on a cell, which is typically the best suitable cell (i.e., strongest Reference Signal Received Power (RSRP)/Reference Signal Received Quality (RSRQ) or similar) on the current carrier used by the wireless device 20. The wireless device 20 needs or desires to perform one or more D2D services (e.g., D2D discovery and/or D2D communication, for instance). This need may be triggered by some user action, but other triggers may be possible. For instances, the trigger may be an application need for D2D communication.

In response, the wireless device 20 determines the current camping network node capability with reference to D2D support according to any of the embodiments described above. In case the network node does not support D2D communication (or D2D communication performance needed according to the application need), the wireless device 20 determines an adjacent cell supporting the desired D2D communication. The determination of neighboring cell D2D support may be determined by the wireless device 20 itself or it may be based on signaling from the camping cell (e.g., via SI broadcast signaling). The adjacent cell supporting the desired D2D communication may be an inter-frequency or inter-RAT cell. The wireless device 20 then makes a cell reselection to the best suitable cell supporting the desired D2D communication need. The wireless device 20 may also perform cell detection (e.g., based on one or more known signals such as synchronization or reference signals) and/or verification (e.g., based on one or more known signals) prior to reselecting to or establishing a connection to that cell. Hence, in some embodiments, a forced reselection is made to a cell even though standard prior art cell reselection criteria are not fulfilled.

Figure 13:
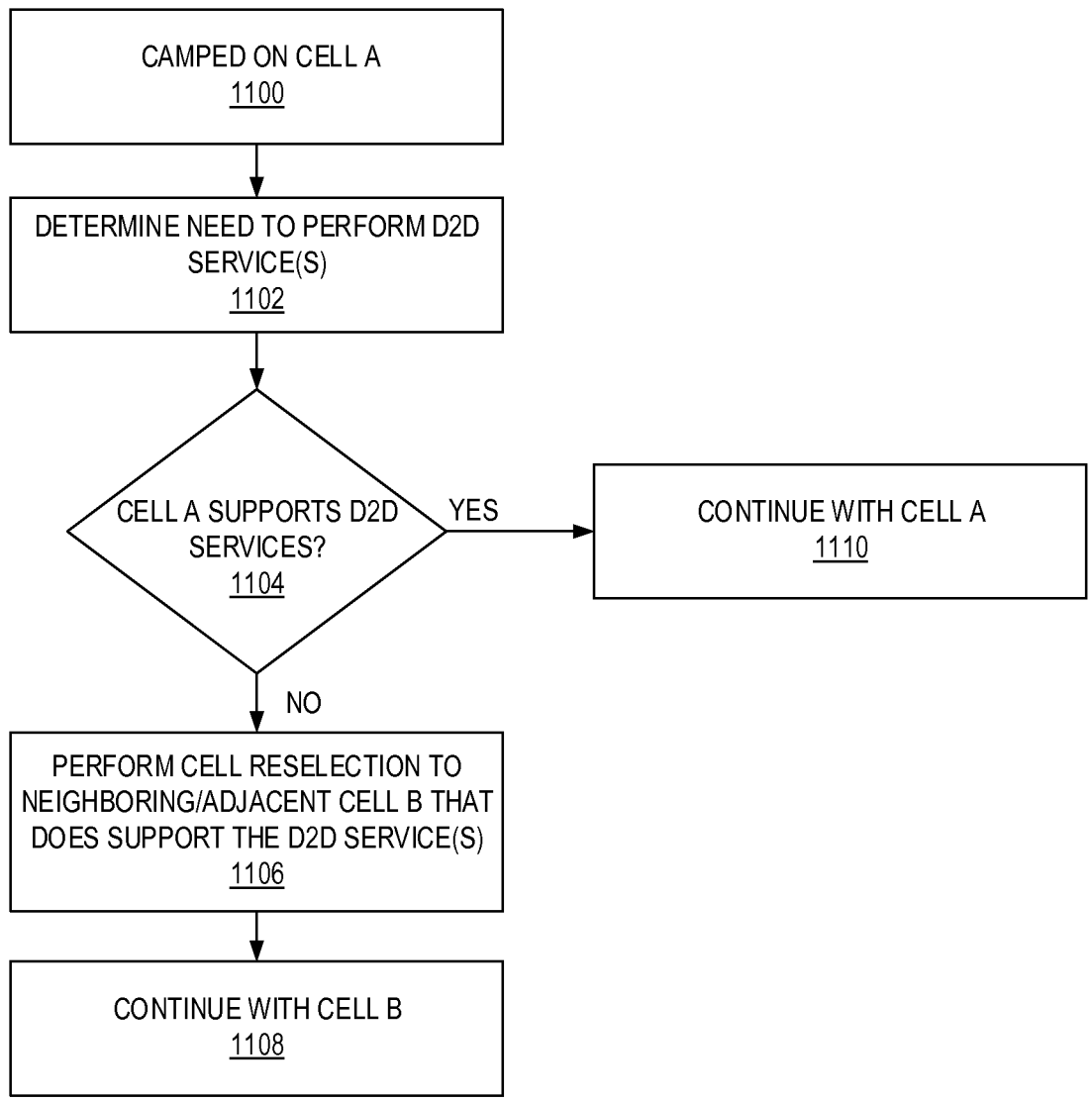
FIG. 13 is a flow chart that illustrates a wireless device embodiment for performing a mobility operation by an idle wireless device camped on a cell when there is a need to perform a D2D service that is not supported by the camped on cell according to some embodiments of the present disclosure.

FIG. 13 illustrates an embodiment for using D2D related information to perform mobility operations by wireless devices 20 in an idle mode. The wireless device 20 is camping on a cell controlled by a network node (e.g., a radio network node). To be camped on a cell refers to a wireless device 20 (e.g., a UE) that has completed the cell selection/reselection process and has chosen a cell. The wireless device 20 monitors system information and (in most cases) paging information. A camped on cell typically is the best suitable cell (i.e., strongest RSRP/RSRQ or similar) on a current carrier.

As illustrated in FIG. 13, a D2D capable wireless device 20 is camped on a cell (e.g., Cell A) controlled by a radio network node, e.g., a base station 16 (step 1100). As detailed above, a D2D capable wireless device 20 typically camps on a suitable cell, which corresponds to a cell with the strongest RSRP/RSRQ, or similar measurement, on a current carrier. In some embodiments, the wireless device 20 camps on an adequate cell when a suitable cell is not available. The wireless device 20 may seek to perform one or more D2D services such as, for example, D2D discovery and/or D2D communication. This may be triggered by user action, by an application, or the like.

Thus, the wireless device 20 determines a need to perform one or more D2D services (step 1102). D2D related information (e.g., D2D related capabilities) of the network node controlling the current camped on cell can be obtained in accordance with, e.g., any of the embodiments described above. The wireless device 20 determines whether the camped on cell supports the one or more D2D services (step 1104). If the camped on cell supports the D2D services, then the wireless device 20 continues by connecting to the camped on cell (e.g., Cell A) (step 1110). On the other hand, if the camped on cell does not support the D2D services, then the wireless device 20 performs cell reselection to a neighboring or adjacent cell (e.g., Cell B) that does support the one or more D2D services (step 1106). The wireless device 20 then continues with the selected cell (e.g., Cell B) by connecting to that cell (step 1108).

Figure 14A:
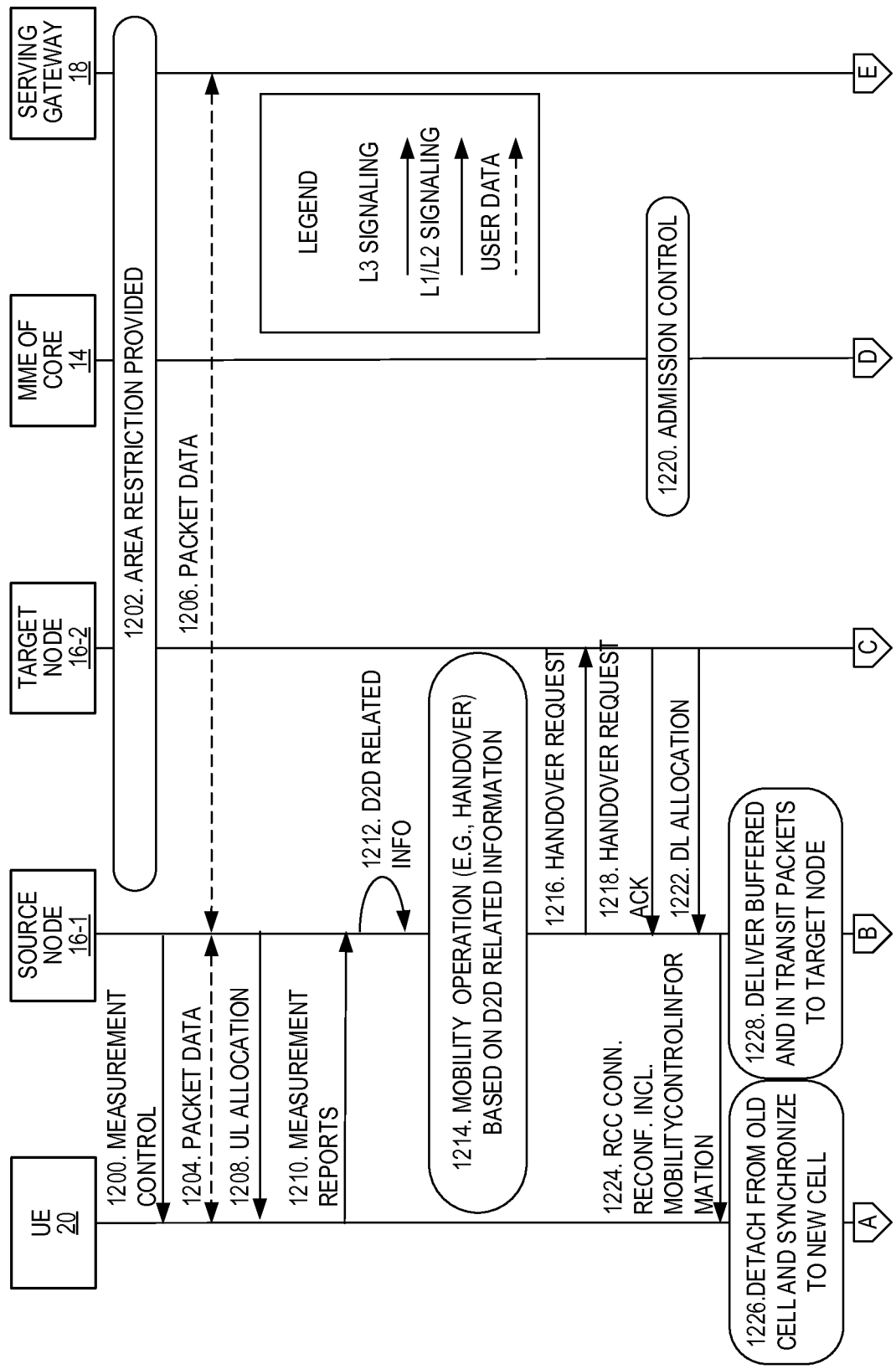
FIGS. 14A and 14B are a flow chart that illustrates an intra-Mobility Management Entity (MME)/Serving Gateway (SGW) handover based on obtained D2D related information according to some embodiments of the present disclosure.
Figure 14B:
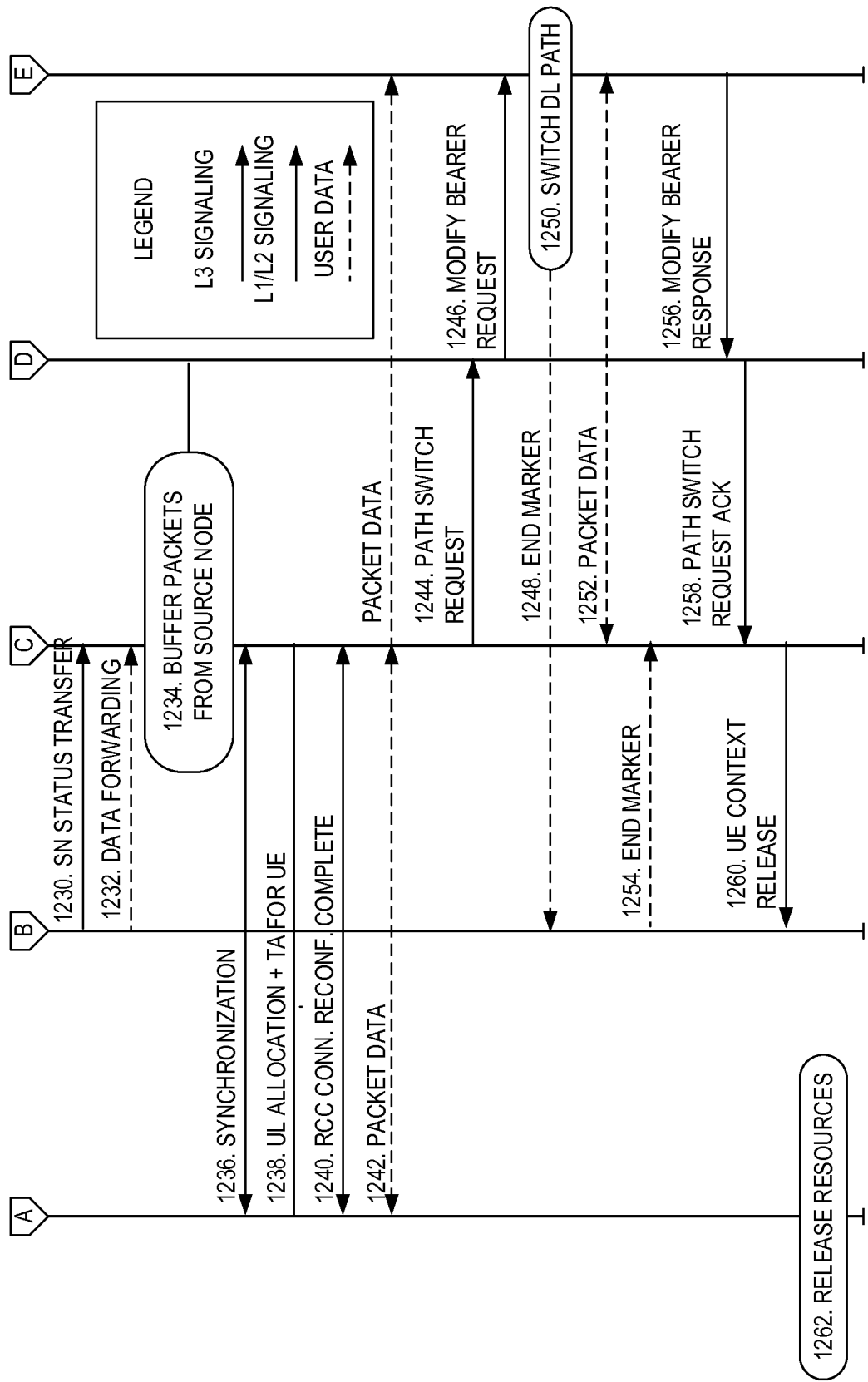

FIGS. 14A and 14B are a call, or communication, flow diagram that illustrates an intra-MME/SGW handover based on obtained D2D related information according to one example embodiment of the present disclosure. In other words, FIGS. 14A and 14B show an example handover procedure by using D2D related information. Shown therein are detailed communications between various nodes in the cellular communications system 10 to perform a mobility operation (e.g., handover) to a target node, e.g., base station 16-2 based on obtained D2D related information. The nodes shown in FIGS. 14A and 14B for performing the mobility operation include a wireless device, or UE, 20, a source base station, or source node, 16-1, a target base station, or target node, 16-2, the MME of the core network 14, and a SGW 18.

In this example, steps 1200 through 1210 and 1216 through 1260 are the same as those in the conventional intra-MME/SGW handover procedure. However, in step 1212, D2D related information is obtained by the source node 16-1, as detailed above. The obtained D2D related information is then used to perform a mobility operation, such as a handover of the UE 20 to the target node 16-2, as described above (step 1214). Once the D2D related information is used to perform the handover (e.g., select the target cell for the handover), the process continues in the conventional manner.

Although the described solutions may be implemented in any appropriate type of telecommunications system supporting any suitable communications standards and using any suitable components, particular embodiments of the described solutions may be implemented in an LTE network. The network may include one or more instances of wireless devices 20, which may also be referred to as wireless communication devices such as, for example, conventional UEs, communications (Machine-Type Communications (MTC))/Machine-to-Machine (M2M) UEs), and one or more radio access nodes (e.g., eNBs or other base stations 16) capable of communicating with wireless devices 20, along with any additional elements suitable to support communication between wireless devices 20 and radio access nodes that have D2D capabilities.

Further, in some embodiments, network nodes (e.g., some or all of the radio access nodes 16) provide D2D related information to other network nodes and/or wireless communication devices, as detailed above. In some embodiments, the network nodes obtain D2D related information of other network nodes and use the D2D related information for one or more mobility operations, as detailed above. Still further, in some embodiments, wireless devices 20 obtain D2D related information of one or more nodes, and use the obtained information for one or more mobility operations, as detailed above.

Figure 15:
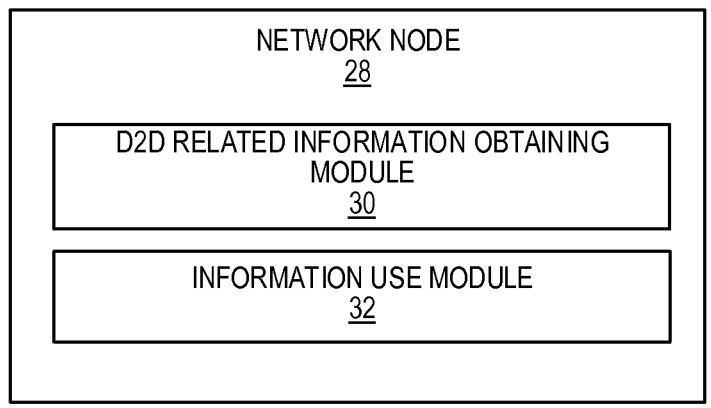
FIG. 15 is a block diagram of a network node according to some embodiments of the present disclosure.
Figure 16:
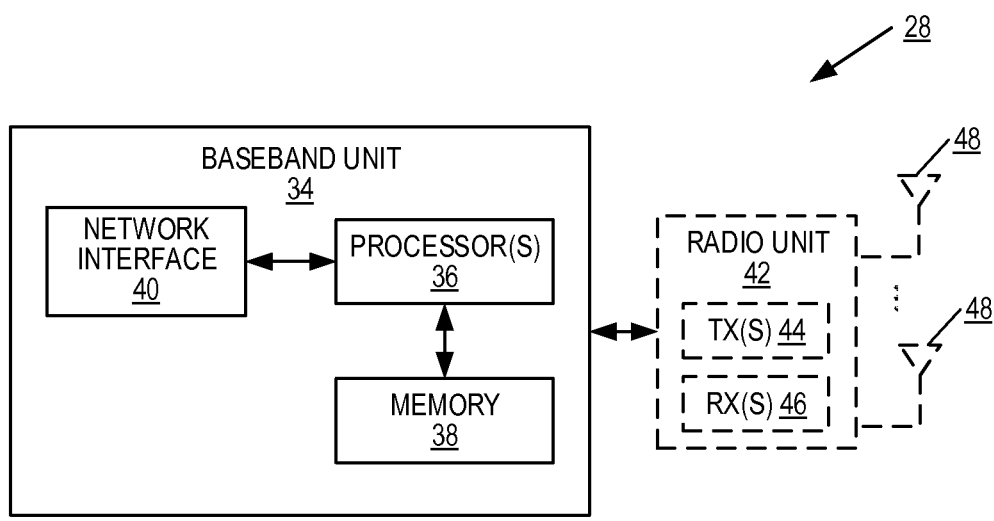
FIG. 16 is a block diagram of a network node according to some embodiments of the present disclosure.

Although a network node may represent network nodes that include any suitable combination of hardware and/or software, these nodes may, in particular embodiments, represent devices such as the example network node illustrated in greater detail by FIGS. 15 and 16. Similarly, although the illustrated wireless communication devices may represent communication devices that include any suitable combination of hardware and/or software, these wireless communication devices may, in particular embodiments, represent devices such as the example wireless device 20 illustrated in greater detail by FIGS. 17 and 18.

FIG. 15 is a block diagram of a network node 28 according to some embodiments of the present disclosure. Note that this discussion is equally applicable to any signaling node such that, for example, the network node 28 may be a core network node or a radio network node. As illustrated, the network node 28 includes a D2D related information obtaining module 30, and an information use module 32, each of which is implemented in software. In some embodiments, the D2D related information obtaining module 30 operates to obtain D2D related information for one or more nodes, as detailed above. Lastly, the information use module 32 operates to use the obtained D2D related information to perform one or more mobility operations to other network nodes or wireless devices, as detailed above.

FIG. 16 is a block diagram of the network node 28 according to some embodiments of the present disclosure. As illustrated, the network node 28 includes a baseband unit 34 that includes one or more processors 36 such as, for example, one or more Central Processing Units (CPUs), Application Specific Integrated Circuits (ASICs), and/or Field Programmable Gate Arrays (FPGAs), memory 38, and a network interface 50. If the network node 28 is a radio network node (e.g., a base station 16), the network node 28 also includes a radio unit 42, including one or more transmitters 44 and one or more receivers 46 coupled to one or more antennas 48. In some embodiments, the functionality of the network node 28 is implemented in software stored in the memory 38 for execution by the one or more processors 36. In some embodiments, the network node 28 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the network node 28 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 38).

Figure 17:
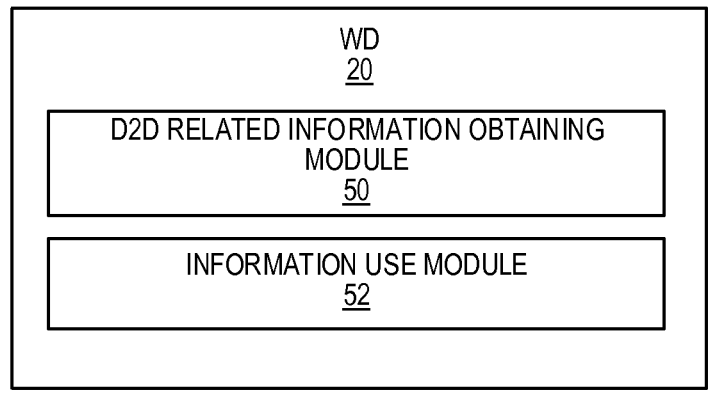
FIG. 17 is a block diagram of a wireless device according to some embodiments of the present disclosure.

FIG. 17 is a block diagram of a wireless device 20 according to some embodiments of the present disclosure. As illustrated, the wireless device 20 includes a D2D related information obtaining module 50 and an information use module 52, each of which is implemented in software. In some embodiments, the D2D related information obtaining module 50 operates to obtain D2D related information for one or more nodes, as detailed above. Lastly, the information use module 52 operates to use the obtained D2D related information to perform one or more mobility operations to other network nodes or wireless devices, as detailed above.

Figure 18:
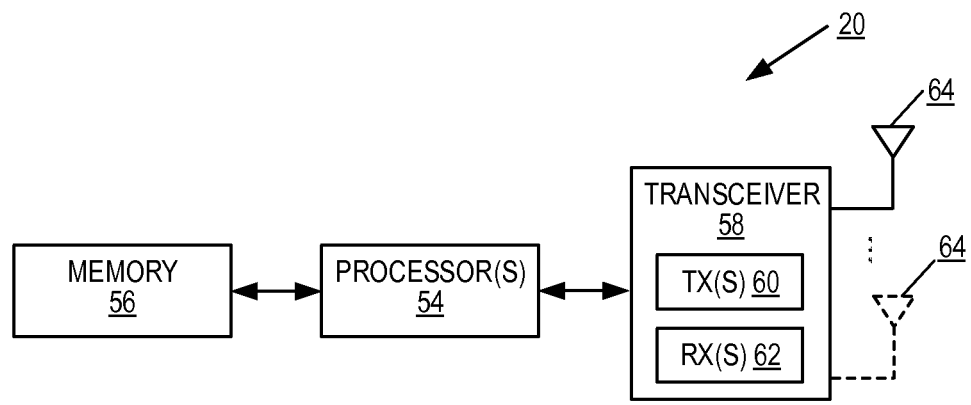
FIG. 18 is a block diagram of a wireless device according to some embodiments of the present disclosure.

FIG. 18 is a block diagram of a wireless device 20 according to some embodiments of the present disclosure. As illustrated, the wireless device 20 includes one or more processors 54 such as, for example, one or more CPUs, ASICs, and/or FPGAs, memory 56, and a transceiver 58 including one or more transmitters 60 and one or more receivers 62 coupled to one or more antennas 64. In some embodiments, the functionality of the wireless device 20 is implemented in software stored in the memory 56 for execution by the one or more processors 54 such that the wireless device 20 operates according to any of the embodiments described herein. In some embodiments, the wireless device 20 may include additional components beyond those in FIG. 18 that may be responsible for providing certain aspects of the wireless device's 20 functionality, including any one of the functionality described above and/or any functionality necessary to support the solution detailed above.

In some embodiments, a computer program including instructions which, when executed by at least one processor, cause the at least one processor to carry out the functionality of the wireless device 20 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56).

The embodiments detailed above provide systems and methods for performing mobility operations in a cellular communications network using D2D related information. In one embodiment, a method of operation of a network node to perform at least one mobility operation for a first wireless device is provided. In one embodiment, the method includes obtaining D2D related information and performing at least one mobility operation for the first wireless device using the obtained D2D related information. In one embodiment, the D2D related information includes D2D related information associated with one or more of the following: the first wireless device, at least one second wireless device where each second wireless device is involved or may be involved in a D2D operation with the first wireless device, a first radio network node, and a second radio network node. In one embodiment, the first radio network node is a base station of a cell serving the first wireless device. The first radio network node may be the same or different from the network node in which the method is performed. Further, in one embodiment, the second radio network node is a base station of a target cell for the first wireless device. The method further includes performing at least one mobility operation for the first wireless device using the obtained D2D related information.

In one embodiment, a network node configured to perform at least one mobility operation for a first wireless device is provided. In one embodiment, the network node includes a processor configured to obtain D2D related information and then perform at least one mobility operation for the first wireless device using the obtained D2D related information. The D2D related information includes D2D related information associated with one or more of the following: the first wireless device, at least one second wireless device where each second wireless device is involved or may be involved in a D2D operation with the first wireless device, a first radio network node, and a second radio network node. In one embodiment, the first radio network node is a base station of a cell serving the first wireless device. The first radio network node may be the same or different from the network node in which the method is performed. Further, in one embodiment, the second radio network node is a base station of a target cell for the first wireless device.

In another embodiment, a method of operation of a first wireless device to perform a mobility operation is provided. In one embodiment, the method includes obtaining D2D related information and performing at least one mobility operation for the first wireless device using the obtained D2D related information. The D2D related information includes D2D related information associated with one or more of the first wireless device, at least one second wireless device where each second wireless device is involved or may be involved in a D2D operation with the first wireless device, a first radio network node, and a second radio network node (e.g., a base station of a target cell for the first wireless device). In one embodiment, the first radio network node is a base station of a cell serving the first wireless device. Further, in one embodiment, the second radio network node is a base station of a target cell for the first wireless device.

In another embodiment, a first wireless device is configured to perform a mobility operation. In one embodiment, the first wireless device includes a transceiver and a processor associated with the transceiver, where the processor is configured to obtain D2D related information and perform at least one mobility operation for the first wireless device using the obtained D2D related information. The D2D related information includes D2D related information associated with one or more of the first wireless device, at least one second wireless device where each second wireless device is involved or may be involved in a D2D operation with the first wireless device, a first radio network node, and a second radio network node (e.g., a base station of a target cell for the first wireless device). In one embodiment, the first radio network node is a base station of a cell serving the first wireless device. Further, in one embodiment, the second radio network node is a base station of a target cell for the first wireless device.

The following acronyms are used throughout this disclosure:

3GPP Third Generation Partnership Project
APP Application
ASIC Application Specific Integrated Circuit
CDMA Code Division Multiple Access
CPU Central Processing Unit
D2D Device-to-Device
dB Decibel
eNB Evolved or Enhanced Node B
EPC Evolved or Enhanced Packet Core
E-UTRAN Evolved or Enhanced Universal Terrestrial Radio Access Network
FDD Frequency Division Duplexing
FPGA Field Programmable Gate Array
GSM Global System for Mobile Communications
LTE Long Term Evolution
M2M Machine-to-Machine
MME Mobility Management Entity
ms Millisecond
MTC Machine-Type Communications
O&M Operations and Management
P2P Peer-to-Peer
PDA Personal Digital Assistant
PGW Packet or Packet Data Network Gateway
PLMN Public Land Mobile Network
ProSe Proximity Service
PSS Primary Synchronization Signal
RAN Radio Access Network
RAT Radio Access Technology
RNC Radio Network Controller
RPLMN Registered Public Land Mobile Network
RRC Radio Resource Control
RRH Remote Radio Head
RRM Radio Resource Management
RSRP Reference Signal Received Power
RSRQ Reference Signal Received Quality
SGW Serving Gateway
SI System Information
SON Self-Organizing Network
SSS Secondary Synchronization Signal
SUPL Secure User Plane Location
TDD Time Division Duplexing
UE User Equipment
UTRA Universal Terrestrial Radio Access
WCDMA Wideband Code Division Multiple Access
WLAN Wireless Local Area Network This disclosure is to be regarded as illustrative instead of limiting. Those skilled in the art will recognize improvements and modifications to the embodiments disclosed herein. All such improvements and modifications are considered within the scope of the concepts disclosed herein and the claims the follow.

What is claimed is:

1. A method of operation of a network node in a cellular communications system, comprising:
    obtaining Device-to-Device, D2D, related information for one or more nodes in the cellular communications system, the one or more nodes including a first wireless device such that the D2D related information comprises information, received from the first wireless device, related to a D2D capability of the first wireless device; and
    using the D2D related information to perform one or more mobility operations associated with the first wireless device, the one or more mobility operations comprising at least one of a group consisting of: a handover operation; a selection operation; and a reselection operation;
    wherein the network node is a radio network node or a core network node and wherein the D2D related information comprises at least one of a group consisting of:
        information indicative of a capability associated with one or more D2D activities of a predetermined type, purpose, application, or service;
        information indicative of a characteristic or type of a D2D activity, service, or application; and
        information indicative of a capability to support a predetermined type of scheduling for D2D activities;
    wherein the network node is a first radio network node, and the one or more nodes comprise the first wireless device and at least one of a group consisting of:
        a second wireless device that is capable of performing D2D operations associated with the first wireless device;
        the first radio network node that is serving the first wireless device; and
        a second radio network node of a target cell for connection by the first wireless device; and
    wherein the D2D related information comprises relative movement characteristics of the first wireless device with respect to the second wireless device.

2. The method of claim 1, wherein using the D2D related information to perform the one or more mobility operations further comprises at least one of a group consisting of:
    prioritizing or ranking two or more cells, Radio Access Technologies, RATs, frequency carriers, or Public Land Mobile Networks, PLMNs, for the wireless device.

3. The method of claim 1, wherein using the D2D related information to perform the one or more mobility operations further comprises at least one of a group consisting of:
    changing one or more cells, Radio Access Technologies, RATs, frequency carriers, or Public Land Mobile Networks, PLMNs, for the wireless device.

4. The method of claim 1, wherein the D2D related information further comprises information indicative of a location.

5. The method of claim 4, wherein at least one of the location, direction of movement, speed of movement, and acceleration of movement is relative to at least one of a radio network node and another wireless device.

6. The method of claim 1, wherein the D2D related information further comprises at least one of a group consisting of:
    information indicative of a capability associated with one or more D2D activities on a predetermined carrier frequency;

information indicative of a capability associated with one or more D2D activities in a predetermined frequency band;

information indicative of a capability associated with one or more D2D activities associated with one or more predetermined Radio Access Technologies, RATs; and information indicative of a capability associated with one or more D2D activities in a predetermined bandwidth.

7. The method of claim 1, wherein the D2D related information further comprises at least one of a group consisting of:

information indicative of a quality of a D2D activity associated with at least one of the one or more nodes;

information indicative of a quality of a D2D service associated with at least one of the one or more nodes; and information indicative of a quality of a D2D application associated with at least one of the one or more nodes.

8. The method of claim 7, wherein at least one of the D2D activity, the D2D service, and the D2D application is ongoing, and comprises at least one of a group consisting of:

D2D discovery;

D2D broadcast, group, or unicast communications;

D2D communications for public safety;

D2D application identity; and type of one or more radio signals or channels transmitted or received.

9. The method of claim 1, wherein the D2D related information further comprises at least one of a group consisting of:

information indicative of a capability to support or participate in D2D operations; and information indicative of a capability to transmit or receive at least one of radio signals or channels associated with D2D operations.

10. The method of claim 1, wherein the D2D related information further comprises at least one of a group consisting of:

information indicative of an availability or a utilization of a bandwidth; and information indicative of an availability or a utilization of one or more radio resources required to perform D2D related operations.

11. The method of claim 1, wherein the D2D related information further comprises at least one of a group consisting of:

information indicative of a number of D2D links associated with the one or more nodes; and information indicative of a number of D2D connections associated with the one or more nodes.

12. The method of claim 1, wherein obtaining the D2D related information comprises obtaining the D2D related information for at least one of the one or more nodes from a node other than the at least one of the one or more nodes.

13. The method of claim 1, wherein obtaining the D2D related information comprises obtaining the D2D related information via at least one of a group consisting of:

signaling at a protocol layer higher than a physical layer; and signaling at the physical layer.

14. The method of claim 1, wherein obtaining the D2D related information comprises:

retrieving the D2D related information from at least one of an internal storage of the network node and an external storage accessible by the network node.

15. The method of claim 14, wherein the D2D related information retrieved from the at least one of the internal storage and the external storage comprises at least one of a group consisting of:

information provided by a subscription service;

information comprising historical data; and information comprising configuration data for the one or more nodes.

16. The method of claim 1, wherein obtaining the D2D related information comprises:

determining the D2D related information based on one or more predefined rules.

17. The method of claim 16, wherein one of the one or more predefined rules associates an identifier associated with the first wireless device to predefined D2D operations.

18. The method of claim 1, wherein the network node is the first radio network node controlling a serving cell of the first wireless device and the second wireless device, the D2D related information comprises D2D related information for the serving cell and one or more neighboring cells, the first wireless device and the second wireless device are capable of one or more D2D operations, and using the D2D related information to perform the one or more mobility operations comprises:

determining that the first radio network node controlling the serving cell does not support the one or more D2D operations;

selecting a neighboring cell from the one or more neighboring cells that supports the one or more D2D operations, thereby defining a selected neighboring cell; and sending respective handover commands to the first wireless device and the second wireless device to perform respective handover operations to the selected neighboring cell.

19. The method of claim 1, wherein the network node is the first radio network node controlling a serving cell of the first wireless device and the second wireless device, the D2D related information comprises D2D related information for the serving cell and one or more neighboring cells, the first wireless device and the second wireless device are capable of one or more D2D operations, and using the D2D related information to perform the one or more mobility operations comprises:

determining that the first radio network node controlling the serving cell does not support the one or more D2D operations;

identifying one or more neighboring cells that support the one or more D2D operations from the one or more neighboring cells;

communicating information of the one or more neighboring cells to at least one of the first wireless device and the second wireless device;

receiving measurements information for the one or more neighboring cells that support the one or more D2D operations from at least one of the first wireless device and the second wireless device;

selecting one of the one or more neighboring cells that support the one or more D2D operations, based on the received measurements information, thereby defining a selected neighboring cell; and communicating respective handover commands to the first wireless device and the second wireless device to perform respective handover operations to the selected neighboring cell.

20. The method of claim 1, wherein the network node is the first radio network node controlling a serving cell of the first wireless device, the D2D related information comprises D2D related information for the serving cell and one or more neighboring cells, and using the D2D related information to perform the one or more mobility operations comprises:

receiving a request for one or more D2D related services from the first wireless device;

determining that the serving cell does not support the one or more D2D related services;

identifying one or more neighboring cells that support the one or more D2D related services from the one or more neighboring cells;

selecting one of the one or more neighboring cells for a handover operation, thereby defining a selected neighboring cell; and communicating a handover command to the first wireless device to perform the handover to the selected neighboring cell.

21. The method of claim 1, wherein the network node is the first radio network node controlling a serving cell of the first wireless device, the D2D related information comprises D2D related information for the serving cell and one or more neighboring cells, and using the D2D related information to perform the one or more mobility operations comprises:

receiving a request for one or more D2D related services from the first wireless device;

determining that the serving cell does not support the one or more D2D related services;

determining one or more neighboring cells that support the one or more D2D related services from the one or more neighboring cells;

communicating information of the one or more neighboring cells that support the one or more D2D related services to the first wireless device;

receiving measurements information for the one or more neighboring cells that support the one or more D2D related services from the first wireless device;

selecting one of the one or more neighboring cells for a handover operation based on the measurements information, thereby defining a selected neighboring cell; and performing a handover operation for the first wireless device to the selected neighboring cell.

22. A network node in a cellular communications system, comprising:

at least one communication interface;

at least one processor; and memory containing instructions executable by the at least one processor, whereby the network node is operative to:

obtain Device-to-Device, D2D, related information for one or more nodes in the cellular communications system, the one or more nodes including a first wireless device such that the D2D related information comprises information, received from the first wireless device, related to a D2D capability of the first wireless device; and use the D2D related information to perform one or more mobility operations associated with the wireless device, the one or more mobility operations comprising at least one of a group consisting of: a handover operation; a selection operation; and a reselection operation;

wherein the network node is a radio network node or a core network node and wherein the D2D related information comprises at least one of a group consisting of:

information indicative of a capability associated with one or more D2D activities of a predetermined type, purpose, application, or service;

information indicative of a characteristic or type of a D2D activity, service, or application; and information indicative of a capability to support a predetermined type of scheduling for D2D activities;

wherein the network node is a first radio network node, and the one or more nodes comprise the first wireless device and at least one of a group consisting of:

a second wireless device that is capable of performing D2D operations associated with the first wireless device;

the first radio network node that is serving the first wireless device; and a second radio network node of a target cell for connection by the first wireless device; and wherein the D2D related information comprises relative movement characteristics of the first wireless device with respect to the second wireless device.

\* \* \* \* \*